US012348900B2

(12) United States Patent
Harb et al.

(10) Patent No.: US 12,348,900 B2
(45) Date of Patent: Jul. 1, 2025

(54) SYSTEMS AND METHODS FOR ENABLING A SMART SEARCH AND THE SHARING OF RESULTS DURING A CONFERENCE

(71) Applicant: Adeia Guides Inc., San Jose, CA (US)

(72) Inventors: Reda Harb, Issaquah, WA (US); Christopher Phillips, Hartwell, GA (US); Tao Chen, Palo Alto, CA (US)

(73) Assignee: Adeia Guides Inc., San Jose, CA (US)

( * ) Notice: Subject to any disclaimer, the term of this patent is extended or adjusted under 35 U.S.C. 154(b) by 271 days.

(21) Appl. No.: 17/965,586

(22) Filed: Oct. 13, 2022

(65) Prior Publication Data
US 2024/0129432 A1    Apr. 18, 2024

(51) Int. Cl.
    *H04N 7/15*     (2006.01)
    *G06F 3/16*     (2006.01)
    *G10L 15/22*    (2006.01)
    *H04L 12/18*    (2006.01)
    *H04N 7/14*     (2006.01)

(52) U.S. Cl.
    CPC ............. *H04N 7/152* (2013.01); *G06F 3/167* (2013.01); *G10L 15/22* (2013.01); *H04L 12/1822* (2013.01); *H04N 7/147* (2013.01); *G10L 2015/223* (2013.01)

(58) Field of Classification Search
    None
    See application file for complete search history.

(56) References Cited

U.S. PATENT DOCUMENTS

| | | | |
|---|---|---|---|
| 7,734,692 B1 | 6/2010 | Kaplan et al. | |
| 11,902,040 B1* | 2/2024 | Seipp | H04L 51/046 |
| 2008/0112337 A1* | 5/2008 | Shaffer | H04L 12/1813 370/260 |
| 2015/0088514 A1* | 3/2015 | Typrin | H04M 3/493 704/231 |
| 2022/0329691 A1* | 10/2022 | Chinthakunta | H04M 3/42042 |
| 2022/0377177 A1* | 11/2022 | Tadge | H04N 7/152 |
| 2023/0290348 A1* | 9/2023 | Rodriguez Bravo | G06F 3/167 |

OTHER PUBLICATIONS

Alireza Kenarsari, "Yet Another Wake-Word Detection Engine," Apr. 24, 2018 (6 pages).

* cited by examiner

*Primary Examiner* — Duc Nguyen
*Assistant Examiner* — Assad Mohammed
(74) *Attorney, Agent, or Firm* — HALEY GUILIANO LLP

(57) ABSTRACT

Systems and methods are provided for enabling virtual assistant interaction during a conference. A conference is initiated between a first computing device and at least a second computing device, and audio input is received at an audio input device, wherein the audio input is received during the conference and the audio input device is in communication with the first computing device. The audio input is transmitted to the second computing device, and a command for activating a virtual assistant is identified in the audio input. In response to identifying a command, the virtual assistant is activated, and the transmission of the audio input to at least the second computing device is automatically stopped. A query is received at the audio input device, and an action, based on the query, is performed via the virtual assistant.

16 Claims, 16 Drawing Sheets

SYSTEMS AND METHODS FOR ENABLING A SMART SEARCH AND THE SHARING OF RESULTS DURING A CONFERENCE

BACKGROUND

The present disclosure is directed towards systems and methods for enabling conference participants to engage with a virtual assistant. In particular, systems and methods are provided herein for enabling conference participants to perform an action, via a virtual assistant, during a conference.

SUMMARY

With the proliferation of computing devices, such as laptops, smartphones and tablets comprising integrated cameras and microphones, as well as high-speed internet connections, audio conferencing and video conferencing has become commonplace and is no longer restricted to dedicated hardware and/or audio/video conferencing rooms. In addition, many of these computing devices also comprise a virtual assistant to aid with day-to-day tasks, such as adding events to calendars and/or ordering items via the internet. An example of a computing device for making video calls is the Facebook Portal with Alexa built in. This example device includes an artificial intelligence-powered camera and a wide-angle lens to offer multiple features such as object detection and automatically zooming and panning on subjects. Many virtual assistants are activated by wake words or phrases, for example "Hey Siri," or manually, for example, by pressing a button on the computing device. Wake word or phrase engines or keyword spotters are algorithms that are implemented on a computing device, such as a smart speaker, to monitor an audio stream for specific wake words using a trained machine learning model. For example, a model can be trained on many voice samples of different people saying the wake word. In some examples, a cloud-based wake word verification mechanism may be utilized in addition to, or as an alternative to local detection of a wake word, or phrase. Such a cloud-based implementation may reduce false wakes and discard any utterance that is not needed, since, for example, the wake word "Alexa" or "Siri" can be part of a television commercial that mentions the word "Alexa" or "Siri." In addition, a portion (e.g., 300 ms) of the audio that was said before the wake word may be streamed to a cloud service for calibration purposes and to enable a better recognition. Usually, the audio stream from the computing device is stopped when the user stops speaking or when the device receives a directive from a cloud service to stop capturing the user's speech. When a user issues a query, the user's speech may be streamed to an automatic speech recognition (ASR) service and then passed to a natural language processing (NLP) service. Normally, the output of the ASR is fed to an NLP module for analysis and to determine the user's intent. In some examples, the ASR and NLP may be combined for faster and more accurate interpretation. While, in isolation, video conferencing and virtual assistants are commonly used, there is little integration between the two. As such, there is a need to enable participants in a video conferencing call to engage with a virtual assistant, without disrupting the conference call and/or issuing confusing queries to the virtual assistant.

To overcome these problems, systems and methods are provided herein for performing an action, via a virtual assistant, during a conference.

Systems and methods are described herein for performing an action, via a virtual assistant, during a conference. A conference is initiated between a first computing device and at least a second computing device, and an audio input is received at an audio input device, wherein the audio input is received during the video conference and the audio input device is in communication with the first computing device. The audio input is transmitted to the second computing device, and a command for activating a virtual assistant is identified in the audio input. In response to identifying the command, the virtual assistant is activated and the transmission of the audio input to at least the second computing device is automatically stopped. A query is received at the audio input device, and an action, based on the query, is performed via the virtual assistant.

In an example system, a user connects to a video conference via a laptop. The user speaks, a laptop microphone picks up the user's speech, and the audio is transmitted to the other video conference participants, where it is output via a speaker. A user says a wake word or phrase for a virtual assistant while on the video conference. In response to the wake word or phrase being identified, the virtual assistant is initiated, and the laptop microphone is muted. Following the wake word, the user speaks a command, for example, a search to perform. The command is received, and a search is performed via the virtual assistant.

The audio input device may be a first audio input device, and receiving the audio input may further comprise receiving the audio input at a second audio input device, where the second audio input device is in communication with the first computing device. Transmitting the audio input may further comprise transmitting the audio input from the first audio input device, and automatically stopping transmission of the audio input may further comprise muting the first audio input device. Receiving the query may further comprise receiving the query via the second audio input device. The second audio input device may be a smart speaker.

The audio input device may be a first audio input device, and the first computing device may be in communication with a second audio input device. A second audio input may be received at a third audio input device, wherein the second audio input may be received during the conference and the third audio input device may be in communication with the second computing device. The second computing device may be enabled to transmit the second audio input to the second audio input device in response to an input. A second command for activating the virtual assistant may be identified in the second audio input. The virtual assistant may be activated in response to identifying the second command, and a second query may be received at the third audio input device. A second action, based on the second query, may be performed via the virtual assistant.

The query may be a search query, and the results of the search query may be received. In response to receiving an input, transmission of the audio input to at least the second computing device may be automatically started and at least a portion of the results of the search query may be transmitted to at least the second computing device. The first computing device may be connected to the conference via a cellular network, and the second computing device may be connected to the conference via a Wi-Fi, or wired, network. The query may be a search query, and the search query may be transmitted from the first computing device to the second computing device. The results of the search query may be received at the second computing device, and at least a portion of the results of the search query may be transmitted to the first computing device.

Initiating the conference may further comprise initiating a conference between the first computing device and a third computing device, wherein the conference comprises audio and video components that are transmitted between all of the computing devices of the conference. Transmitting the audio input may further comprise transmitting the audio input to the third computing device, and the query may comprise a request to initiate direct audio communication between the first computing device and the second computing device. In response to the query, the transmission of the audio component of the conference between the first and second computing devices and the at least third computing device may be stopped, and a direct audio transmission between the first computing device and the second computing device is initiated. In response to the query to initiate direct audio communication between the first computing device and the second computing device, a request may be transmitted from the first computing device to the second computing device to initiate a direct audio transmission. Initiating the direct audio transmission between the first computing device and the second computing device may further comprise initiating the direct audio transmission in response to the request being accepted.

A hierarchy of conference participants may be identified. In response to the query to initiate direct audio communication between the first computing device and the second computing device, it may be identified whether the requesting participant is higher in the hierarchy. If the requesting participant is higher in the hierarchy, initiating the direct audio transmission may further comprise automatically initiating the direct audio transmission. If the requesting participant is at the same level, or lower in the hierarchy, initiating the direct audio transmission may further comprise transmitting a request from the first computing device to the second computing device to initiate a direct audio transmission, and initiating the direct audio transmission between the first computing device and the second computing device may further comprise initiating the direct audio transmission in response to the request being accepted. A representation of the participants in the conference may be generated for display at least one of the computing devices. In response to initiating the direct audio transmission between the first computing device and the second computing device, the representation of the participants in the conference may be updated to visually indicate the direct audio transmission between the first computing device and the second computing device.

BRIEF DESCRIPTIONS OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

The above and other objects and advantages of the disclosure may be apparent upon consideration of the following detailed description, taken in conjunction with the accompanying drawings, in which.

DETAILED DESCRIPTION

Figure 1:
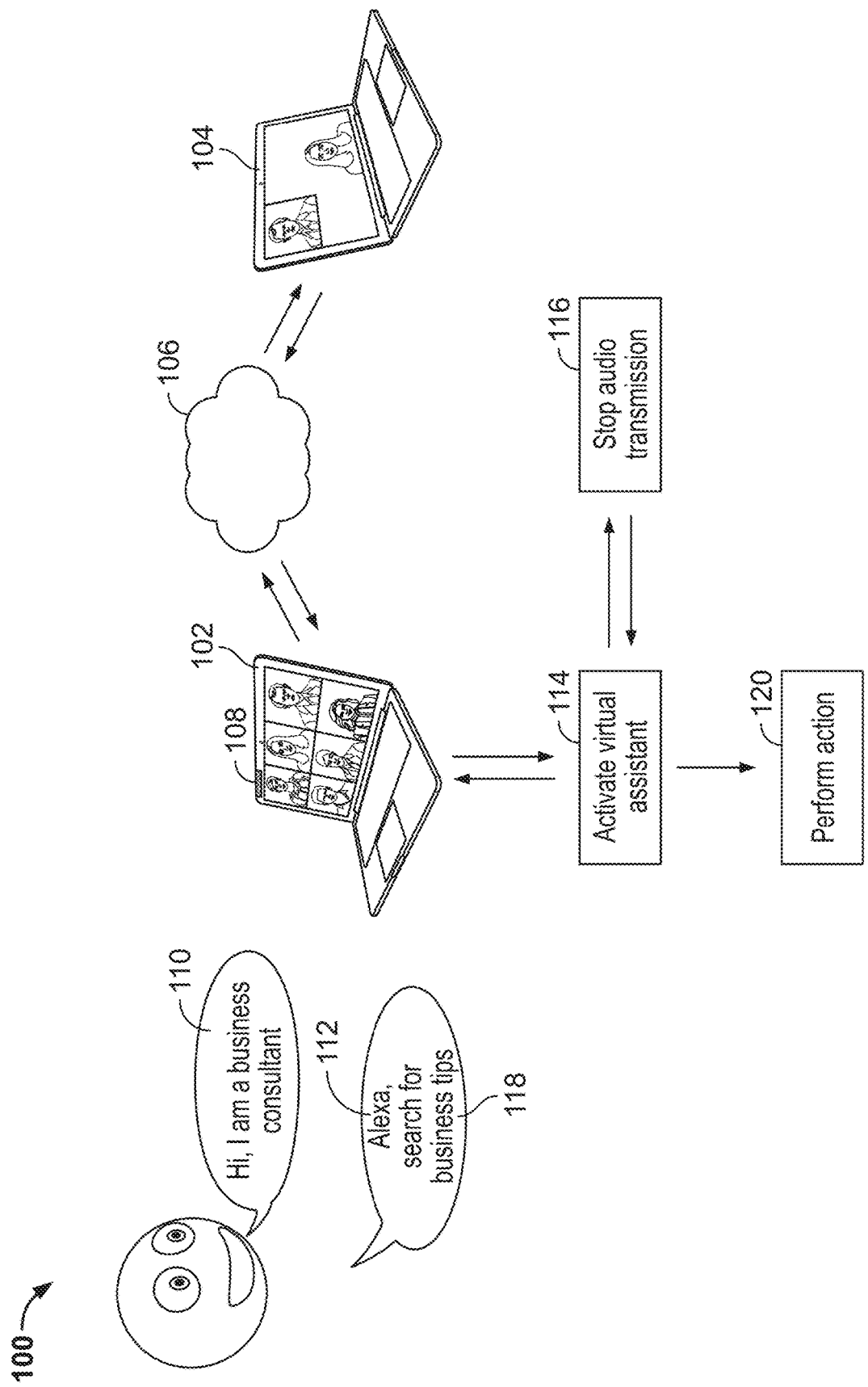
FIG. 1 shows an example environment in which an action is performed, via a virtual assistant, during a video conference, in accordance with some embodiments of the disclosure.

Systems and methods are described herein for performing an action, via a virtual assistant, during a conference. A conference includes any real-time, or substantially real-time, transmission of audio and/or video between at least two computing devices. A video conference comprises at least video and, optionally, audio being transmitted between at least two computing devices. An audio conference is an audio conference where audio is transmitted between at least two computing devices. For example, an audio conference may comprise a direct call between two users. The conference may be implemented via a conferencing service running on a server. In some examples, a conference may be implemented via a dedicated application running on a computing device. The conference may comprise additional channels to enable text, pictures, GIFs, and/or documents to be transmitted via different participants. A conference may be initiated via selecting a user in an address book, entering a user identification, such as an email address and/or a phone number, and/or via selecting a shared link and/or quick response (QR) code.

An audio input device includes a microphone that is in communication with a computing device, including internal and external microphones. In some examples, audio may be received via an audio input device integrated to a first computing device, and the audio may be transmitted to a second computing device. For example, audio may be received via a smart speaker and may be transmitted to a connected laptop, smartphone and/or tablet.

A virtual assistant is any assistant implemented via a combination of software and hardware. A virtual assistant may include a voice assistant, a personal assistant and/or a smart assistant that is implement via a combination of software and hardware. Typically, a virtual assistant receives a query, and performs an action in response to the query. A virtual assistant may be implemented via an application running on a computing device, such as a laptop, smartphone and/or tablet, such as Microsoft Cortana, Samsung Bixby or Apple Siri. In another example, a virtual assistant may be implemented via dedicated hardware, such as an Amazon Alexa smart speaker or a Google Nest smart speaker. Typically, virtual assistants respond to a command comprising a wake word or phrase and are put in a mode for receiving a query following the wake word or phrase. A query may include, for example, requesting that a song is played, requesting that an item is added to a list, ordering an item for delivery, playing a game, requesting a news update and/or requesting a weather update. The virtual assistant may directly perform the action. In other examples, the virtual assistant may perform the action via a third-party application. This may comprise, for example, passing the query to the application via an application programming interface (API). In some examples, the query may comprise instructing the virtual assistant via a skill. A skill is similar to an application for a virtual assistant. Skills may enable, for example, a virtual assistant to output news articles, play music, answer questions, control smart home devices and/or play games with a user.

The disclosed methods and systems may be implemented on one or more computing devices. As referred to herein, the computing device can be any device comprising a processor and memory, for example, a television, a smart television, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, a smartwatch, a smart speaker, an augmented reality device, a mixed reality device, a virtual reality device, a gaming console, or any other television equipment, computing equipment, or wireless device, and/or combination of the same.

The methods and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory, including, but not limited to, volatile and non-volatile computer memory or storage devices such as a hard disk, floppy disk, USB drive, DVD, CD, media cards, register memory, processor caches, random access memory (RAM), etc.

FIG. 1 shows an example environment in which an action is performed, via a virtual assistant, during a video conference, in accordance with some embodiments of the disclosure. Although the example environment 100 is directed towards a video conference, other embodiments (not shown) may include a similar environment directed towards an audio conference. For example, a virtual assistant may be added to an audio only WhatsApp call. The environment 100 comprises a first computing device, in this example, first laptop 102, and a second computing device, in this example, second laptop 104, that communicate via network 106. The first laptop 102 comprises a first audio input device, in this example, an integrated microphone 108 that enables a user to provide an audio input 110. In some examples, the audio input device may be an external microphone and/or another computing device, such as a smart speaker, that is in communication with the laptop 102. In this example, the audio input 110 is the phrase "Hi, I am a business consultant." The microphone 108 receives the audio input, the laptop 102 encodes the received input, and the encoded input is transmitted via network 106 to the second laptop 104. The network may be any suitable network, including the internet, and may comprise wired and/or wireless means. The received audio input is output at the second laptop 104, for example, via a laptop speaker and/or connected headphones. In some examples, the audio input may be converted to text, and the text may be output at the second laptop 104, for example, via a display of the second laptop 104. On identifying that the audio input 110 comprises a command for activating a virtual assistant, such as the wake word "Alexa" 112, a virtual assistant is activated 114, in this example Alexa. Any suitable wake word or phrase may be utilized. In addition, any suitable virtual assistant may be utilized. The virtual assistant may comprise a physical computing device, such as a smart speaker, or may be a virtual assistant that is implemented via an application running on the first laptop 102. The wake word or phrase may be identified via dedicated circuitry, such as circuitry that is present in a smart speaker. In other examples, the audio input may be continually analyzed by a trained machine learning algorithm to identify the wake word and/or phrase. This continual analysis of the audio input may comprise analyzing the audio input via a Google Tensor processor and/or a Samsung Exynos processor. In another example, the audio input, or portions of the audio input, may be transmitted to another computing device, such as a server, via network 106, and the identification may take place at the server. In another example (not shown), rather than proving an audio input comprising a wake word, a user may provide a non-verbal input for activating the virtual assistant. For example, a user may select an icon associated with the virtual assistant at the laptop 102. If the user provides an input for activating the virtual assistant, this essentially supplants the step of identifying a wake word. In this case, the virtual assistant is activated 114 and the process continues as described herein.

Activating 114 the virtual assistant may comprise putting the virtual assistant in a state where it can receive a query. In other examples, activating 114 the virtual assistant may comprise switching the virtual assistant from a standby state to a fully on state. In addition to activating 114 the virtual assistant in response to identifying the wake word and/or phrase, transmitting the audio input to the second laptop 104 is stopped 116. Stopping transmitting the audio input may comprise preventing the audio input being transmitted via network 106 to the second laptop 104. In another example, stopping transmitting the audio input may comprise muting the microphone 108 at the first laptop 102, for example, where the audio input is received via more than one microphone at the first laptop 102. On activating 114 the virtual assistant, a query 118 is identified in the audio input. In this example, the query comprises "Search for business tips." On receiving the query, the virtual assistant performs an action 120. In this example, the action is to perform a search for business tips; however, any suitable action may be performed. For example, other queries may include, for example, requesting that a song be played, requesting that an item be added to a list, ordering an item for delivery, playing a game, requesting a news update and/or requesting a weather update. The virtual assistant may directly perform the action. In other examples, the virtual assistant may perform the action via a third-party application. This may comprise, for example, passing the query to the application via an application programming interface (API). In some examples, the query may comprise instructing the virtual assistant via a skill.

In some examples, the first laptop 102 may comprise two audio input devices. These two audio input devices may comprise two physical microphones, or may be two software-defined microphones that receive audio input via a physical microphone. In some examples, video conference audio may be received and transmitted to the second laptop 104 via a first microphone of the two microphones, and, on detecting the wake word or phrase only the first microphone is muted. The second microphone may be dedicated, at least for the duration of the video conference, to receiving virtual assistant queries. As such, when the first microphone is muted, audio input is no longer transmitted to the second laptop 104.

Figure 2:
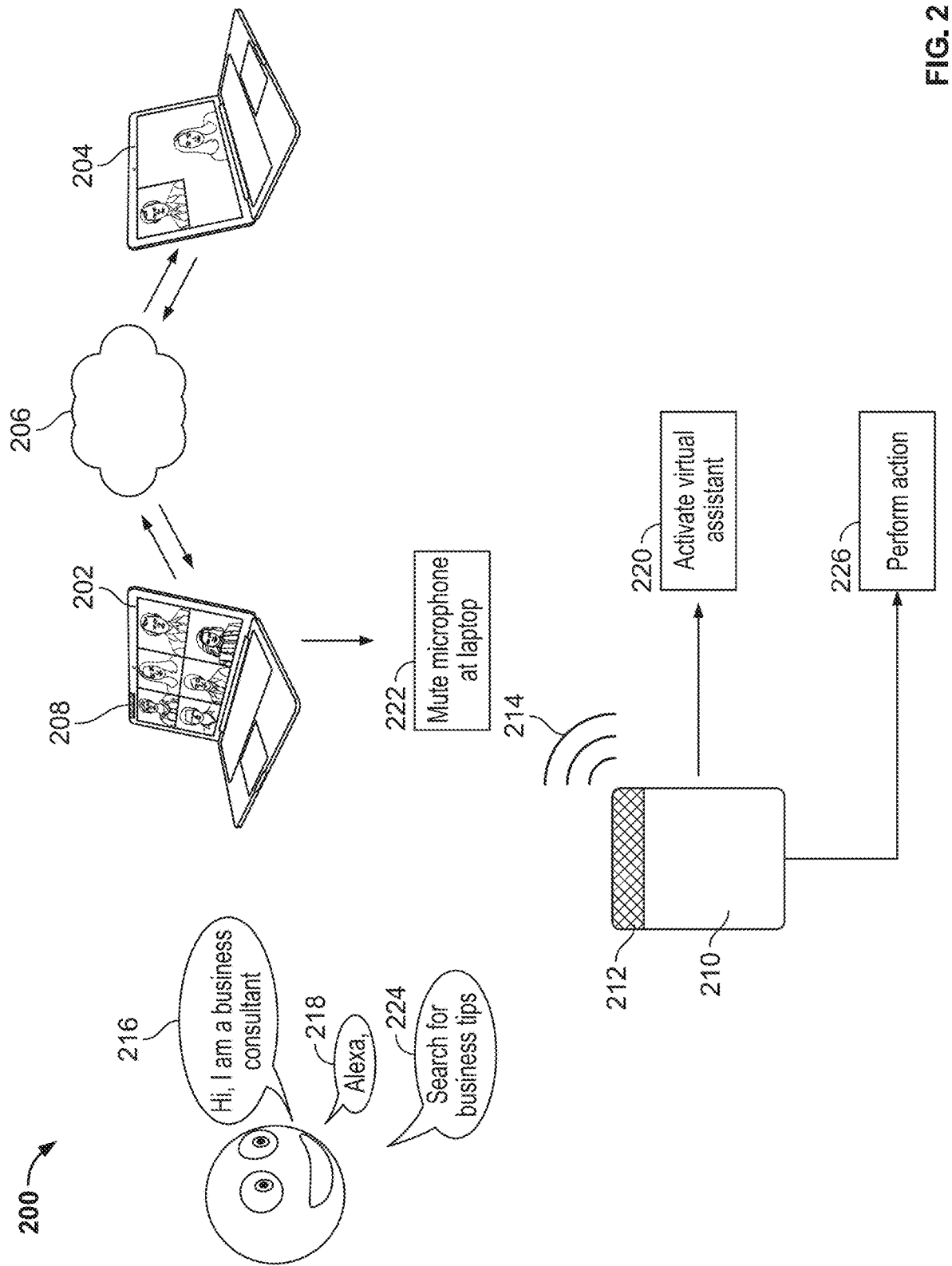
FIG. 2 shows another example environment in which an action is performed, via a virtual assistant, during a video conference, in accordance with some embodiments of the disclosure.

FIG. 2 shows another example environment in which an action is performed, via a virtual assistant, during a video conference, in accordance with some embodiments of the disclosure. Although the example environment 200 is directed towards a video conference, other embodiments (not shown) may include a similar environment directed towards an audio conference. In a similar manner to the environment discussed in connection with FIG. 1, the environment 200 comprises a first computing device, in this example, first laptop 202, a second computing device, in this example, second laptop 204, that communicate via network 206, and a smart speaker 210. The first laptop 202 comprises a first audio input device, in this example, an integrated first microphone 208. The first laptop 202 is in communication 214 with smart speaker 210 via, for example, Wi-Fi and/or Bluetooth. In other examples, the first laptop 202 may communicate with the smart speaker 210 via any suitable wireless and/or wired means. The smart speaker 212 comprises a second audio input device, in this example, an integrated second microphone 212. Though again, any suitable audio input device may be used instead of the integrated microphones 208, 212, such as those described above in connection with FIG. 1. The audio input 216 is received at both the first and second microphones 208, 212. On identifying the wake word or phrase 218 in the audio input, a virtual assistant is activated 220 at the smart speaker 210 and the first microphone 208 is muted 222. In another example (not shown), rather than proving an audio input comprising a wake word, a user may provide a non-verbal input for activating the virtual assistant. For example, a user may select an icon associated with the virtual assistant at the laptop 202, or press a button on a physical smart device 210 associated with a virtual assistant. If the user provides an input for activating the virtual assistant, this essentially supplants the step of identifying a wake word. In this case, the virtual assistant is activated 220 and the process continues as described herein. Any of the embodiments described herein may also enable a user to provide a non-verbal input for activating the virtual assistant in this manner.

A query 224 is received via the second microphone 212 of the smart speaker 210, as this microphone 212 has not been muted. In this example, the query comprises "Search for business tips." On receiving the query, the virtual assistant performs an action 226. In this example, the action is to perform a search for business tips; however, any suitable action may be performed. Although this example comprises a physical smart speaker, a similar arrangement is contemplated for a virtual assistant implanted via an application running on the first laptop 202. As before, the first laptop 202 may comprise two microphones and, on detecting the wake word or phrase only the first microphone is muted. The second microphone of the first laptop 202 may be dedicated, at least for the duration of the video conference, to receiving virtual assistant queries. As such, when the first microphone is muted, audio input is no longer transmitted to the second laptop 204.

Figure 3:
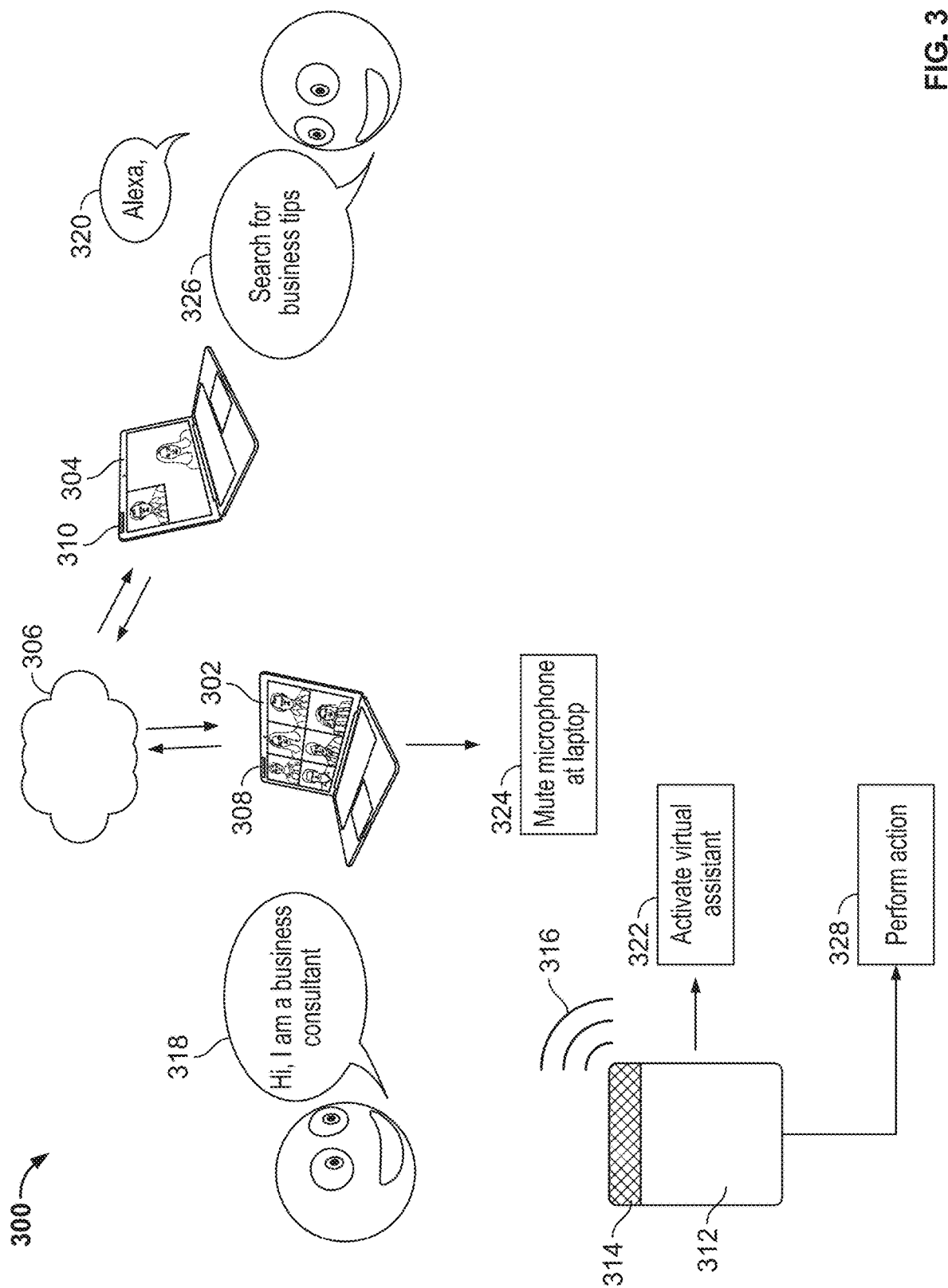
FIG. 3 shows another example environment in which an action is performed, via a virtual assistant, during a video conference, in accordance with some embodiments of the disclosure.

FIG. 3 shows another example environment in which an action is performed, via a virtual assistant, during a video conference, in accordance with some embodiments of the disclosure. Although the example environment 300 is directed towards a video conference, other embodiments (not shown) may include a similar environment directed towards an audio conference. In a similar manner to the environments discussed in connection with FIGS. 1 and 2, the environment 300 comprises a first computing device, in this example, first laptop 302, and a second computing device, in this example, second laptop 304, that communicate via network 306, and a smart speaker 312. The first laptop 302 comprises a first audio input device, in this example, an integrated first microphone 308, and the second laptop 304 comprises a second audio input device, in this example an integrated second microphone 310. The first laptop 302 is in communication 316 with smart speaker 312 via, for example, Wi-Fi and/or Bluetooth. In other examples, the first laptop 302 may communicate with the smart speaker 312 via any suitable wireless and/or wired means. The smart speaker 312 comprises a second audio input device, in this example, an integrated third microphone 314. Though again, any suitable audio input device may be used instead of the integrated microphones 308, 310, 314, such as those described above in connection with FIG. 1. An audio input 318 is received at both the first and second microphones 308, 314 and is transmitted to the second laptop 304, where it is output.

At the second laptop, audio input comprising the wake word or phrase 320 is received. This audio input is transmitted to the first laptop 302, via the network 306, where the wake word or phrase is identified. On identifying the wake word or phrase 320, a virtual assistant is activated 322 at the smart speaker 312 and the first microphone 308 is muted 324. A query 326 is received via the second microphone 310 and is transmitted via the network 306 to the first laptop 302, where it is output and is received via the third microphone 314 of the smart speaker 314. In other examples, a participant in the video conference may enable a direct connection between the second laptop 304 and the virtual assistant. For example, the virtual assistant may be implemented via an application that is associated with software for running the video conference. In this example, the query comprises "Search for business tips." On receiving the query, the virtual assistant performs an action 328. In this example, the action is to perform a search for business tips; however, any suitable action may be performed. As before, the first laptop 302 may comprise two microphones and, on detecting the wake word or phrase only the first microphone is muted. In another example (not shown), the second microphone may not be integrated in the first laptop 302 and may be physically located on a connected companion device, such as a smart speaker. The video conferencing application running on the first laptop 302 may have control over both the integrated first microphone 308 and the second microphone. The second microphone of the first laptop 302 may be dedicated, at least for the duration of the video conference, to receiving virtual assistant queries. In some examples, the second microphone of the first laptop 302 may be a software-defined microphone and may receive input directly from a video conference application.

In one example, a physical smart speaker device can be added to a video conference by any participant. A connection from the computing device partaking in the video conference to the physical smart speaker device may be via a Wi-Fi or a Bluetooth connection. If the smart speaker device is connected to the video conference computing device, incoming audio and outgoing audio may be routed from the video conference computing device based on a sharing state. The participant with the connected smart speaker may choose to include the smart speaker in the video conference. The participant sharing the smart speaker device can allow all participants in the video conference to perform voice queries with the smart speaker device. In this example, all incoming audio from the video conference may be routed to the smart speaker device, and output from the smart speaker device may also be routed to other video conference participants. In some examples, the user can enable only themselves to perform queries via the smart speaker device, and the user may share the results of the query (for example, via the audio output of the smart speaker device) from the smart speaker device to the other video conference participants. In some examples, the user can also interact with the smart speaker device and receive the output from the smart speaker device without sharing to the group. In some examples, the user can interact with the smart speaker device while muted on the conference call. When muted on the video conference call, all outgoing audio (i.e., from the video conference computing device) may be muted, such that the other video conference participants do not receive the audio; however, the smart speaker device can still receive audio input from the user sharing the smart device on the call.

In one example, when a user shares a smart speaker device with the video conference participants, an icon (in some examples, similar to a mute icon) can be displayed beside the user's name to other video conference participants, as an indicator that the user is sharing a smart speaker device and is allowing members on the call to interact with the smart speaker device. In some examples, the icon can be unique to a smart speaker. When the user sharing the smart speaker device disables the other video conference participants from interacting with the smart speaker device, an indicator may be shown over the smart speaker device icon to indicate that no video conference participants can interact with it. In another example, when a smart speaker device is responding to a query, the user sharing the smart speaker device may have an indicator showing the user's smart speaker is providing a response to a query. This can, for example, be a highlight around the video of the user hosting the smart speaker device in the video conference, which can, in some examples, mimic the lighting on a smart speaker device.

Figure 4:
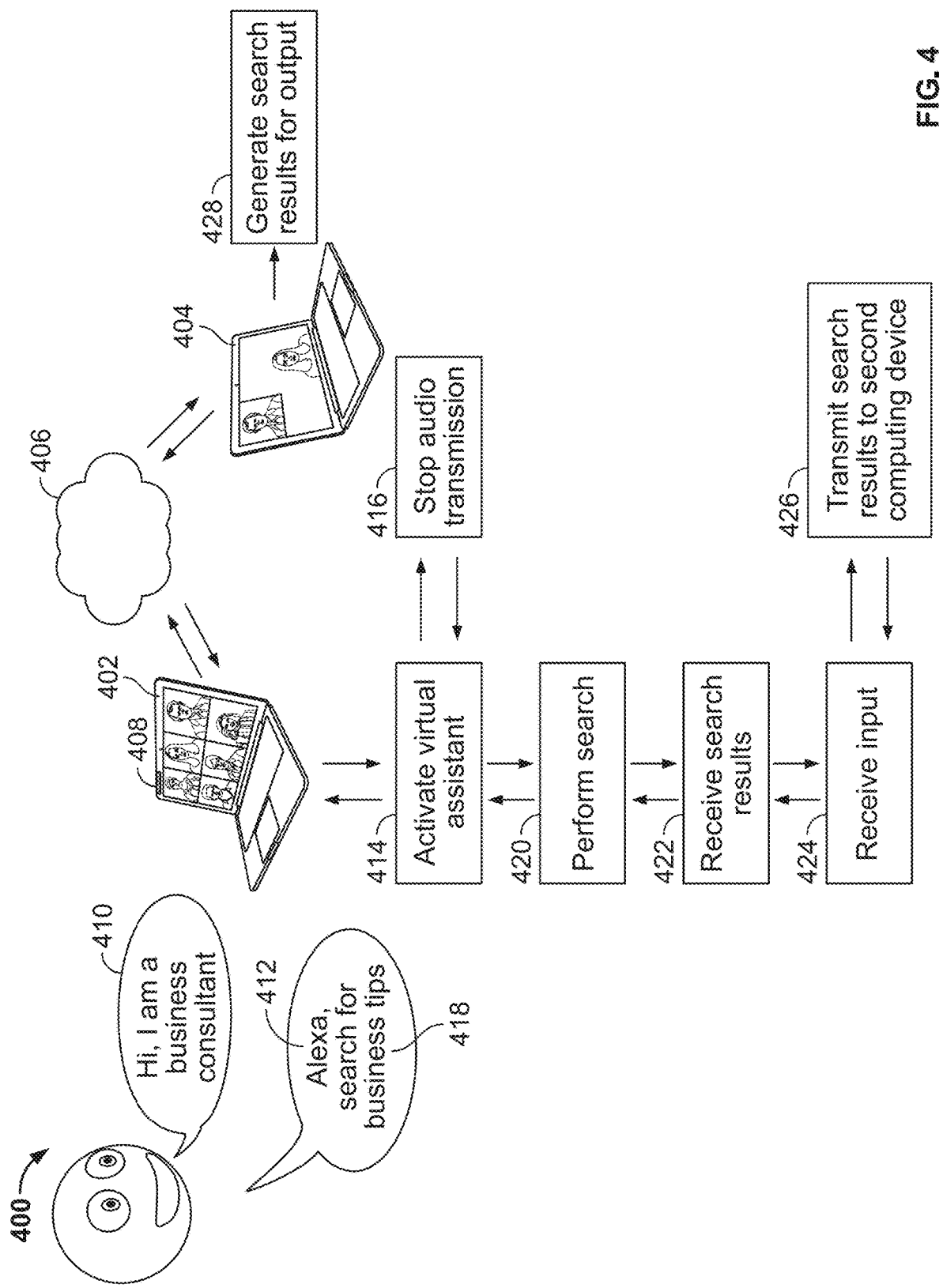
FIG. 4 shows another example environment in which an action is performed, via a virtual assistant, during a video conference, in accordance with some embodiments of the disclosure.

FIG. 4 shows another example environment in which an action is performed, via a virtual assistant, during a video conference, in accordance with some embodiments of the disclosure. Although the example environment 400 is directed towards a video conference, other embodiments (not shown) may include a similar environment directed towards an audio conference. In a similar manner to the environments discussed in connection with FIGS. 1-3, the environment 400 comprises a first computing device, in this example, a first laptop 402, and a second computing device, in this example, a second laptop 404, that can communicate via network 406. The first laptop 402 comprises an audio input device, in this example, an integrated microphone 408. Audio input 410 is received at the microphone 408. On identifying the wake word or phrase 412 in the audio input, a virtual assistant is activated 414 and the audio transmission is stopped 416. Stopping transmitting the audio input may comprise preventing the audio input being transmitted via network 406 to the second laptop 404. In another example, stopping transmitting the audio input may comprise muting the microphone 408 at the first laptop 402, for example, where the audio input is received via more than one microphone at the first laptop 402. A query 418 is received via the microphone 408. In this example, the query comprises "Search for business tips." On receiving the query, a search 420 is performed via the virtual assistant and the search results are received 422. In response to receiving an input 424, for example via a user interface element that enables a user to share the results with another participant of the video conference, the search results are transmitted to the second laptop 404 via network 406. On receiving the search results, the search results are generated for output 428 at the second laptop 404. In some examples, a user interface element may be displayed at the second laptop 404 that indicates that search results have been shared and gives one or more options for the user to respond. For example, the user interface element may enable the search results to be generated for output at that time or at a later time, shared with another video conference participant, shared via a link, output in a visual or audible manner and/or saved to a local and/or cloud storage device associated with the second laptop 404.

In some examples, the search results may be shared with all or with some of the video conference participants via a graphical user interface at the first laptop 402. For example, in response to selecting (pressing or tapping) a "share with" graphical user interface element, a text-based chat application may be launched to enable the video conference participants to share results with each other. In some examples, this may be a chat window that is integrated with video conferencing software. In other examples, this sharing application may be separate from the video conferencing software. In some examples, the video conferencing software may automatically resize the video streams from the different video conferencing participants to enable at least a portion of the search results to be displayed. In some examples, if there are multiple participants on the video conference, then the user can choose to share the search results with all the participants, or to share the search results with selected participants via, for example, selecting a name associated with a participant via a graphical user interface. In some examples, the search results may essentially be a feed that is displayed in an automatically launched chat application.

Figure 5:
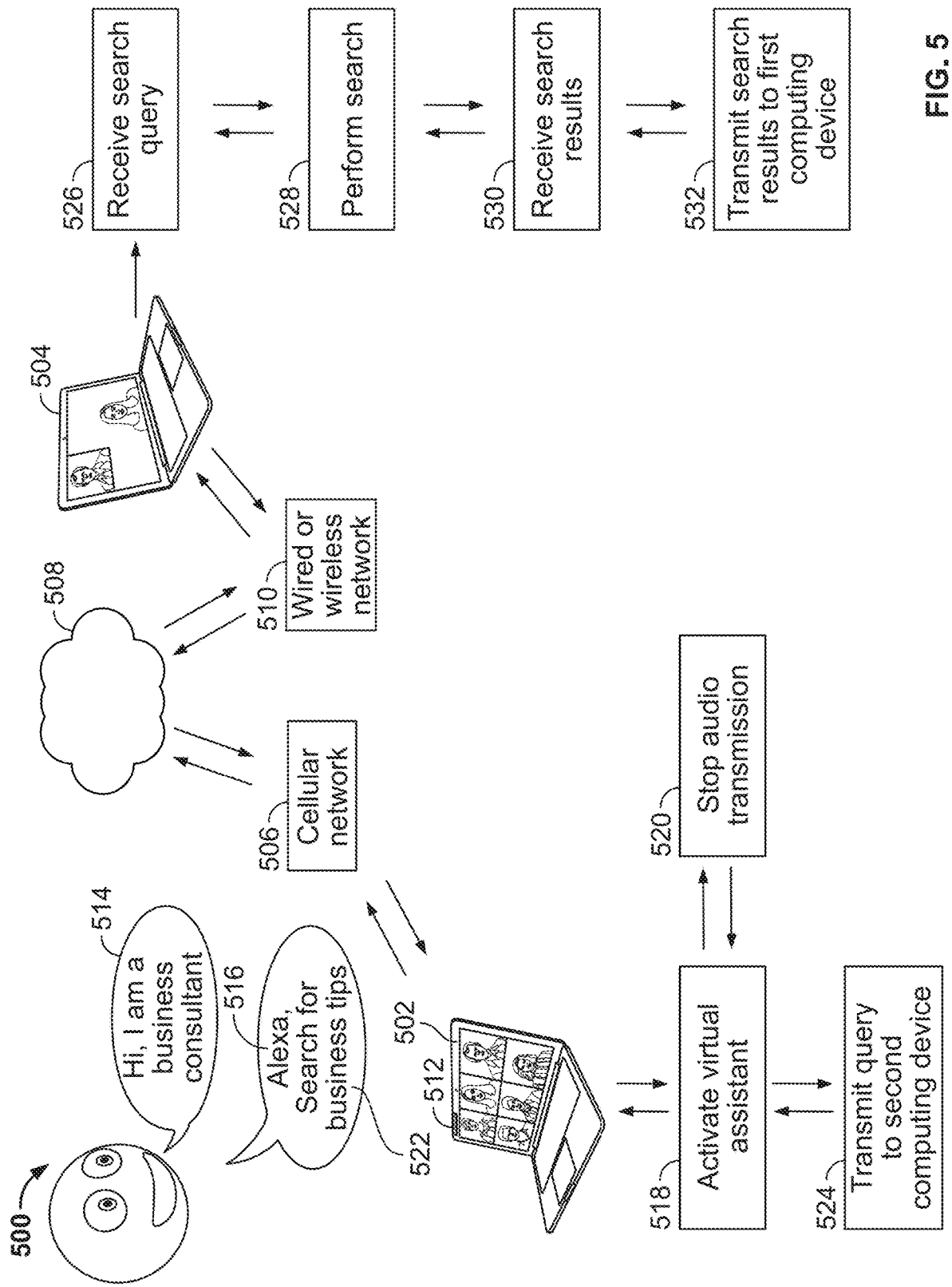
FIG. 5 shows another example environment in which an action is performed, via a virtual assistant, during a video conference, in accordance with some embodiments of the disclosure.

FIG. 5 shows another example environment in which an action is performed, via a virtual assistant, during a video conference, in accordance with some embodiments of the disclosure. Although the example environment 500 is directed towards a video conference, other embodiments (not shown) may include a similar environment directed towards an audio conference. In a similar manner to the environments discussed in connection with FIGS. 1-4, the environment 500 comprises a first computing device, in this example, first laptop 502, and a second computing device, in this example, second laptop 504, that communicate via network 508. The first laptop 502 is connected to the network 508 via a cellular network 506, for example a 3G, 4G and/or 5G cellular network. The second laptop 504 is connected to the network 508 via a wired or wireless network 510, for example a local Wi-Fi network. An indication of the type of network that each participant in the video conference is connected to may be transmitted to other participants in the video conference. In some examples, the indication may be transmitted to a server that is coordinating the video conference. The first laptop 502 comprises an audio input device, in this example, an integrated microphone 512. Audio input 514 is received at microphone 512. On identifying the wake word or phrase 516 in the audio input, a virtual assistant is activated 518 and the audio transmission is stopped 520. Stopping transmitting the audio input may comprise preventing the audio input being transmitted via network 508 to the second laptop 504. In another example, stopping transmitting the audio input may comprise muting the microphone 512 at the first laptop 502, for example, where the audio input is received via more than one microphone at the first laptop 502. A query 522 is received via the microphone 512. In this example, the query comprises "Search for business tips."

On receiving the query, the query is transmitted 524 to the second laptop 504 via the network 508. The virtual assistant may transmit the query. In other examples, transmitting the query may be initiated by an application running on the first laptop 502, such as the video conference software. In some examples, any video conference participant that is connected to a non-cellular network may provide an indication of whether they will allow search queries to be transmitted to them. In some examples, such a setting may be associated with a user profile and, in some examples, may be stored at a server such that the setting is implemented whenever the user logs onto the video conferencing platform. If more than one video conference participant has indicated that they are able to receive search queries, then a participant may be chosen for receiving search queries. Criteria for choosing which participant to transmit the search query to may be based on current computing load at a participant computing device, quality of network connection to the participant and/or historical reliability of successfully carrying out searches. On receiving 526 the search query at the second laptop 504, a search is performed 528. This search may be performed via a virtual assistant running on the second laptop 504, or a virtual assistant that the second laptop 504 is in communication with, such as a smart speaker. In other examples, the virtual assistant may be hosted at a server remote from the second laptop 504, and the search may be performed via the assistant running on the server. On receiving 530 the search results, the search results are transmitted 532, via the network 508, to the first laptop 502. On receiving the search results, the search results may be generated for output at the first laptop 502. In some examples, a user interface element may be displayed at the first laptop 502 that indicates that search results have been shared and gives one or more options for the user to respond. For example, the user interface element may enable the search results to be generated for output at that time or at a later time, shared with another video conference participant, shared via a link, output in a visual or audible manner and/or saved to a local and/or cloud storage device associated with the first laptop 502. An advantage of such an arrangement is that if a video conference participant joins the video conference on, for example, a mobile phone while in a moving vehicle and would like to initiate a voice query, they can do so.

Figure 6:
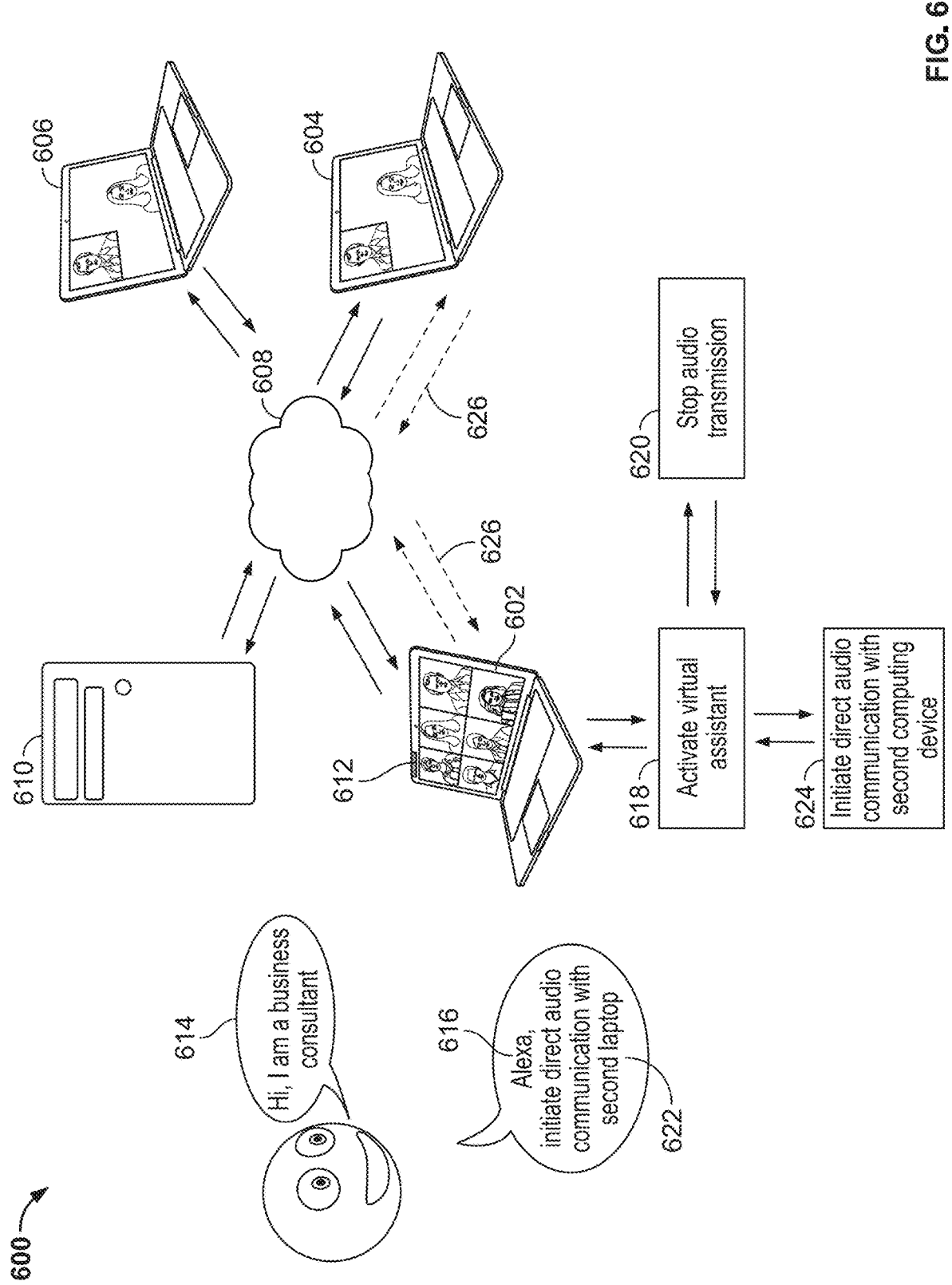
FIG. 6 shows another example environment in which an action is performed, via a virtual assistant, during a video conference, in accordance with some embodiments of the disclosure.

FIG. 6 shows another example environment in which an action is performed, via a virtual assistant, during a video conference, in accordance with some embodiments of the disclosure. Although the example environment 600 is directed towards a video conference, other embodiments (not shown) may include a similar environment directed towards an audio conference. FIG. 6 shows another example environment in which an action is performed, via a virtual assistant, during a video conference, in accordance with some embodiments of the disclosure. In a similar manner to the environments discussed in connection with FIGS. 1-5, the environment 600 comprises a first computing device, in this example, a first laptop 602; a second computing device, in this example, a second laptop 604; a third computing device, in this example, a third laptop 606; and a server 610, all of which communicate via network 608. The first laptop 602 comprises an audio input device, in this example, an integrated microphone 612. Audio input 614 is received at microphone 612. On identifying the wake word or phrase 616 in the audio input, a virtual assistant is activated 618 and the audio transmission is stopped 620. Stopping transmitting the audio input may comprise preventing the audio input being transmitted via network 608 to the second laptop 604 and the third laptop 606. In another example, stopping transmitting the audio input may comprise muting the microphone 612 at the first laptop 602, for example, where the audio input is received via more than one microphone at the first laptop 602. A query 622 is received via the microphone 612. In this example, the query comprises "Initiate direct audio communication with second laptop." On receiving the query, a direct audio communication is initiated 624 with the second laptop 604. In some examples, initiating the direct audio communication automatically removes both the first laptop 602 and the second laptop 604 from the audio component of the video conference, and in some examples, the video component as well, and a direct audio link 626 is set up to enable the first laptop 602 and the second laptop 604 to communicate. In some examples, the audio of the video conference may be routed via server 610, and by initiating the direct audio link, the audio is transmitted directly from the first laptop 602 to the second laptop 604 via network 608, without transmitting the audio via the server. In other examples, a user interface element and/or request is output at the second laptop 604 requesting confirmation that a direct audio link should be initiated. In other examples, the direct audio link can be set up between any participants 602, 604, 606 in the video conference.

Figure 7:
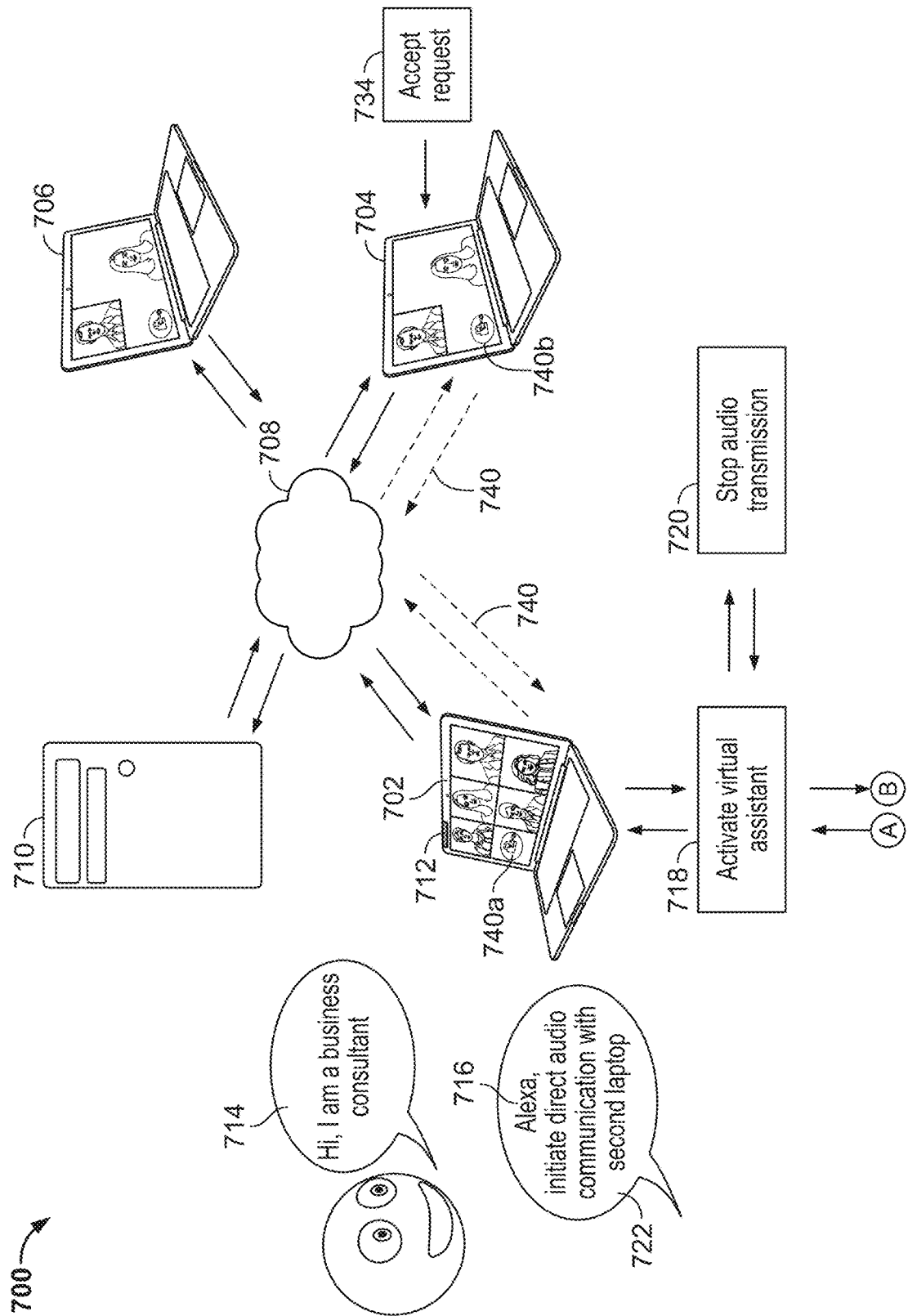
FIG. 7 shows another example environment in which an action is performed, via a virtual assistant, during a video conference, in accordance with some embodiments of the disclosure.
Figure 7:
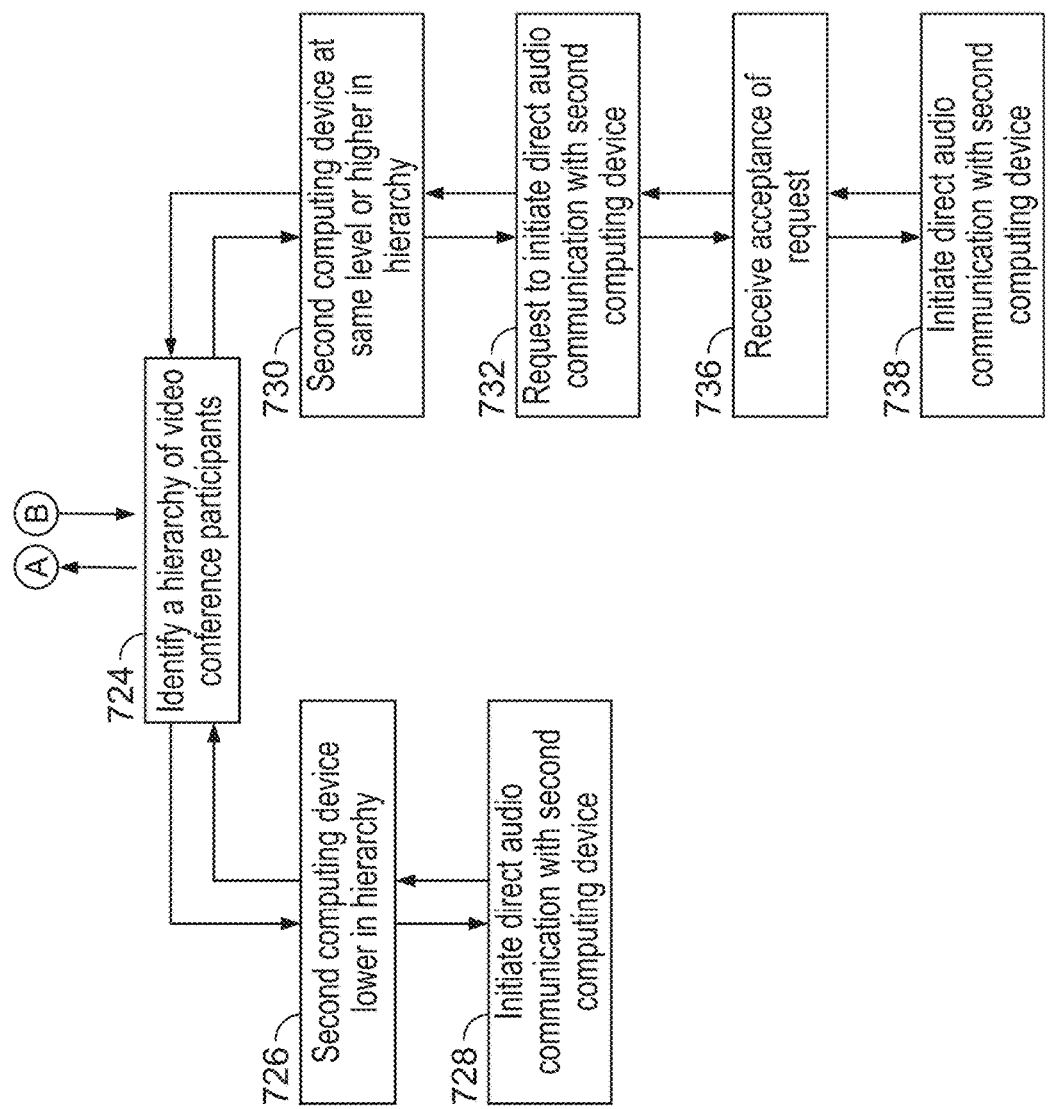

FIG. 7 shows another example environment in which an action is performed, via a virtual assistant, during a video conference, in accordance with some embodiments of the disclosure. Although the example environment 700 is directed towards a video conference, other embodiments (not shown) may include a similar environment directed towards an audio conference. In a similar manner to the environments discussed in connection with FIGS. 1-6, the environment 700 comprises a first computing device, in this example, a first laptop 702; a second computing device, in this example, a second laptop 704; a third computing device, in this example, a third laptop 706; and a server 710, all of which communicate via network 708. The first laptop 702 comprises an audio input device, in this example, an integrated microphone 712. Audio input 714 is received at microphone 712. On identifying the wake word or phrase 716 in the audio input, a virtual assistant is activated 718 and the audio transmission is stopped 720. Stopping transmitting the audio input may comprise preventing the audio input being transmitted via network 708 to the second laptop 704 and the third laptop 706. In another example, stopping transmitting the audio input may comprise muting the microphone 712 at the first laptop 702, for example, where the audio input is received via more than one microphone at the first laptop 702. A query 722 is received via the microphone 712. In this example, the query comprises "Initiate direct audio communication with second laptop." On receiving the query, a hierarchy of video conference participants is identified 724. On identifying 726 that the second laptop 704 is lower down in the hierarchy, a direct audio communication is initiated 728 with the second laptop 704, and a direct audio link 740 is automatically set up to enable the first laptop 702 and the second laptop 704 to communicate via network 708. On identifying 730 that the second laptop 704 is at the same level or higher in the hierarchy, a request to initiate a direct audio communication with the second laptop 704 is transmitted via the network 708 to the second laptop 704. A user interface element and/or request is output at the second laptop 704 requesting confirmation that a direct audio link is initiated. On receiving input accepting 734 the request, an indication of the acceptance is transmitted via network 708 to the first laptop 702, where it is received 736. On receiving the request, a direct audio link 740 is set up to enable the first laptop 702 and the second laptop 704 to communicate via the network 708. In some examples, either, or both, of the first and second laptops may generate an icon 740a, 740b for display that indicates the laptops 702, 704 are partaking in a direct audio communication. In other examples, the direct audio link can be set up between any participants 702, 704, 706 in the video conference.

In some examples, all the participants in the video conference remain part of the video conference and can be seen by one another; however, the audio session for the two participants is terminated and re-established. The direct audio communication may be implemented via web real-time communication (WebRTC). WebRTC enables the video conference participants to establish a direct communication (e.g., peer-to-peer (P2P)) where the audio is transmitted from one user to another directly, without the audio passing through a server. Signaling (i.e., coordinating a direct audio communication session via the user of the control messages) may be performed in accordance with the WebRTC standard, including the initiation of session description protocol (SDP) objects, or the offer and/or answer by the two parties. Similarly, WebRTC defines the use of a session traversal utilities for network address translation (STUN) server to store the list of internet protocol (IP) addresses and/or ports for each party device (interactive connectivity establishment (ICE) candidates). The direct audio communication can be initiated via, for example, a dedicated user interface element such as an icon or a voice command or by actively selecting a thumbnail display of a participant in the video conference.

On receiving an input associated with initiating the direct audio communication, a voice chat request may be transmitted to the selected participant, or participants, in order to inform the recipient, or recipients, of the pending direct audio communication request. Upon accepting the chat offer, a P2P audio session is established. The offer may include the name of the initiating participant and all the invitees. In another example, the invite is automatically accepted; this is useful in enterprise video chat applications where the organizer or manager decides to have a direct audio communication with one or more specific participants. In some examples, the direct audio communication can be disabled during a presentation, or while a person such as the organizer is speaking. Such settings can apply to all meetings or to a specific meeting (e.g., the setting may be defined by the organizer of a video conference). Participants in a direct audio communication may be identified by other participants in the video conference. Any visual indicator can be used, including automatically adjusting the layout of the window or thumbnails associated with the participants. For example, the users that are engaged in a direct audio communication may be placed next to each other in a window of a video conferencing application. Additionally, the shape and/or size of the thumbnails may be automatically adjusted. Another example includes grouping the thumbnails of the direct audio communication participants and displaying the group in a different location in a window of a video conferencing application, such as the upper right corner. Such groups may include icons displaying the name of the participants, or smaller thumbnail displays with different shape (e.g., a circle) of the participants, including video thumbnails. In another example, during the direct audio communication, a flashing icon of an obvious color, for example, red or orange, may be used to apprise the participants in the video conference of an ongoing side chat between a subset of the participants. In some examples, the use of an icon and/or flashing icon can be made visible to the involved participants only, or to all the participants in the video conference.

Figure 8:
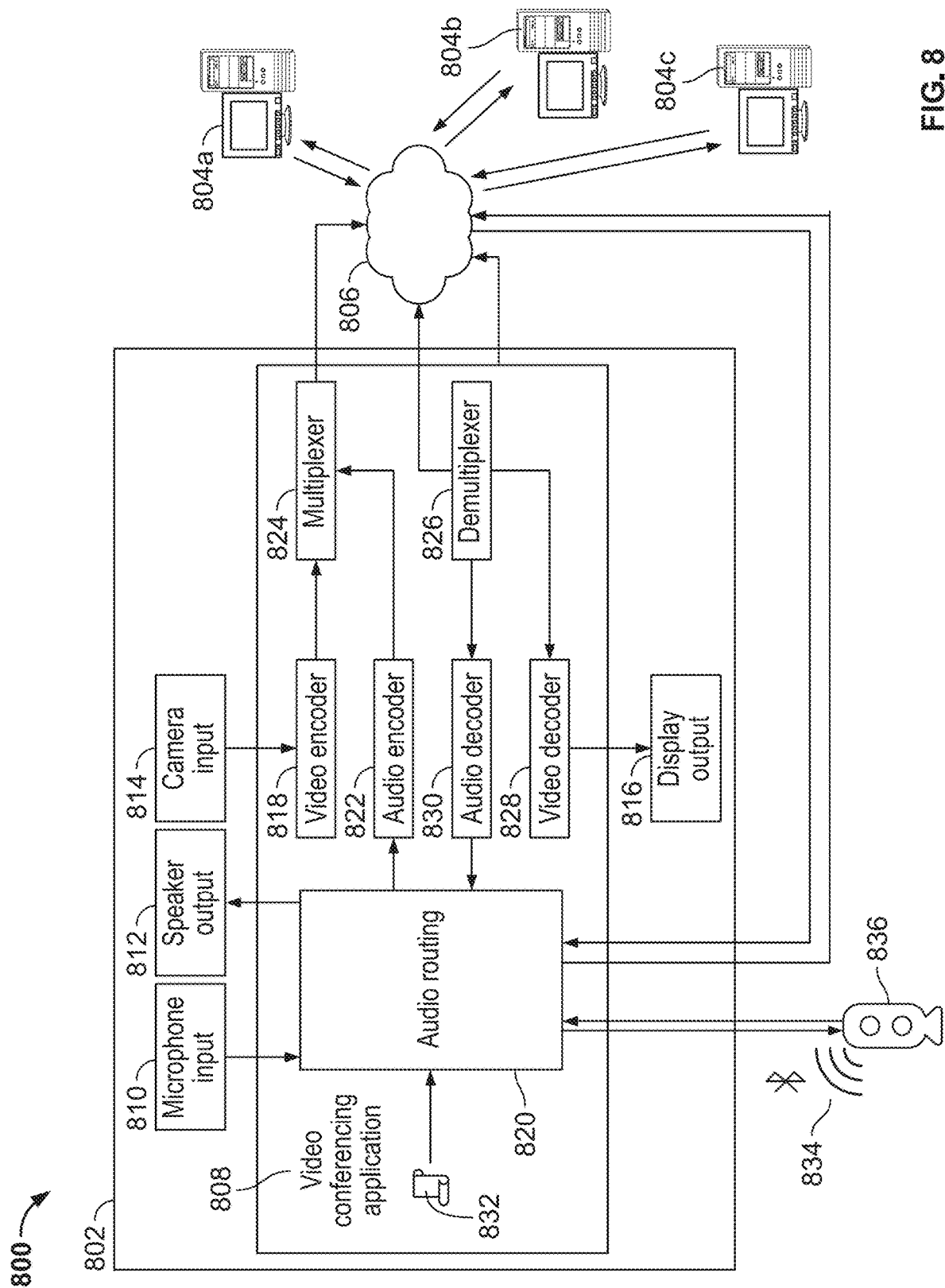
FIG. 8 shows an example environment for routing audio, via a virtual assistant, during a video conference, in accordance with some embodiments of the disclosure.

FIG. 8 shows an example environment for routing audio, via a virtual assistant, during a video conference, in accordance with some embodiments of the disclosure. The environment 800 comprises first, second, third and fourth computing devices 802, 804a, 804b, 804c connected via network 806, and a smart speaker 836 in communication 834 with the first computing device 802. A video conferencing application 808 runs on the first computing device 802, and the first computing device 802 comprises a microphone input 810, a speaker output 812, a camera input 814 and a display output 816. On initiating a video conference, raw video is received from the camera input 814 and is encoded via a video encoder 818. Raw audio is received from the microphone input 810 and is routed 820 to the audio encoder 822, where the audio is encoded. The encoded video and audio are multiplexed at the multiplexer 824 to produce a multiplexed audiovisual stream, and the encoded and multiplexed audiovisual stream is transmitted via network 806 to the second, third and fourth computing devices 804a, 804b, 804c. The second, third and fourth computing devices 804a, 804b, 804c transmit respective multiplexed audiovisual streams, via network 806, to the first computing device 802 where they are demultiplexed by demultiplexer 826 to produce encoded video and audio. The encoded video is decoded by video decoder 828 to produce raw video, the raw video is generated for display, and is displayed at the display output 816. The encoded audio is decoded by audio decoder 830 to produce raw audio, which is routed via audio router 820 and is output at speaker output 812. The audio routing is based on smart speaker audio policy, or policies 832. In some examples, the audio that is received from the second, third and fourth computing devices 804a, 804b, 804c is sent to only the speaker output 812. In other examples, the audio is sent to the smart speaker 836 in addition, or alternatively, to the speaker output 812. In some examples, the audio that is transmitted to the second, third and fourth computing devices 804a, 804b, 804c may be received from only the microphone input 810. In other examples, audio received from the smart speaker is transmitted to the second, third and fourth computing devices 804a, 804b, 804c in addition to, or alternatively to, the microphone input 810.

Figure 9:
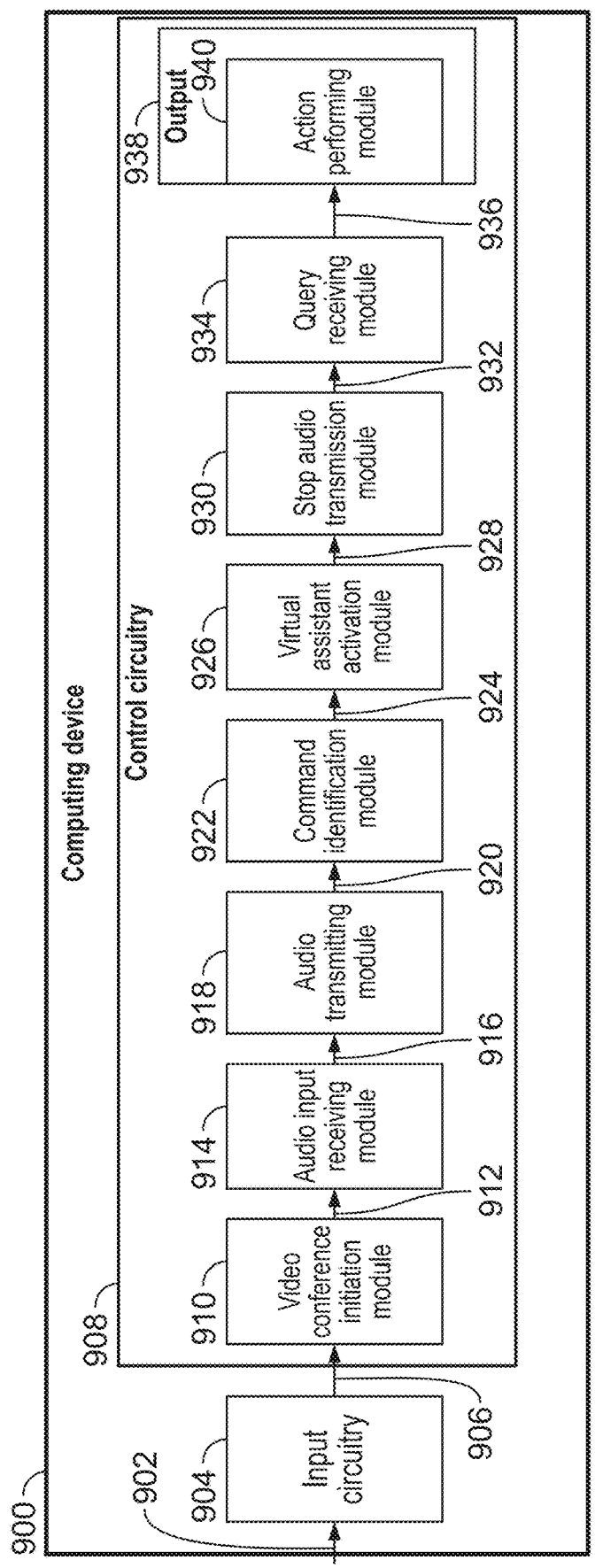
FIG. 9 shows a block diagram representing components of a computing device and dataflow therebetween for performing an action, via a virtual assistant, during a video conference, in accordance with some embodiments of the disclosure.

FIG. 9 shows a block diagram representing components of a computing device and dataflow therebetween for performing an action, via a virtual assistant, during a video conference, in accordance with some embodiments of the disclosure. Although the computing device 900 is directed to a video conference, other embodiments (not shown) may include similar components directed to an audio conference. Computing device 900 (e.g., computing device 102, 202, 302, 402, 502, 602, 702, 802), as discussed above, comprises input circuitry 904, control circuitry 908 and output circuitry 930. Control circuitry 908 may be based on any suitable processing circuitry (not shown) and comprises control circuits and memory circuits, which may be disposed on a single integrated circuit or may be discrete components and processing circuitry. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i9 processors) or multiple different processors (e.g., an Intel Core i5 processor and an Intel Core i7 processor) and/or a system on a chip (e.g., a Qualcomm Snapdragon 888). Some control circuits may be implemented in hardware, firmware, or software.

Input is received 902 by the input circuitry 904. The input circuitry 904 is configured to receive inputs related to a computing device. For example, this may be via a touchscreen, a keyboard, a mouse and/or a microphone in communication with the computing device 900. In other examples, this may be via a gesture detected via an augmented, mixed and/or virtual reality device. In another example, the input may comprise instructions received via another computing device, for example, a smart speaker. The input circuitry 904 transmits 906 the user input to the control circuitry 908.

The control circuitry 908 comprises a video conference initiation module 910, an audio input receiving module 914, an audio transmitting module 918, a command identification module 922, a virtual assistant activation module 926, a stop audio transmission module 930, a query receiving module 934 and an output module 938 that comprises an action performing module 940. The input is transmitted 906 to the video conference initiation module 910, where a video conference is initiated with at least one other computing device. On initiating the video conference, an indication is transmitted 912 to the audio input receiving module 914, which is configured to receive audio. The received audio is transmitted 916 to the audio transmitting module 918, where the audio is transmitted to at least one other computing device. The audio is also transmitted 920 to the command identification module 922, where the audio is analyzed to identify a command, such as a wake word, or phrase. On identifying a command, an indication is transmitted 924 to the virtual assistant activation module 926, where a virtual assistant is activated. An indication is transmitted 928 to the stop audio transmission module 930, which stops transmission of the audio to the second computing device. An indication, and the audio input, is transmitted 932 to the query receiving module 934, where a query is identified. On identifying a query, the query is transmitted 936 to the output module 938, where an action is performed, based on the query, at the action performing module 940.

Figure 10:
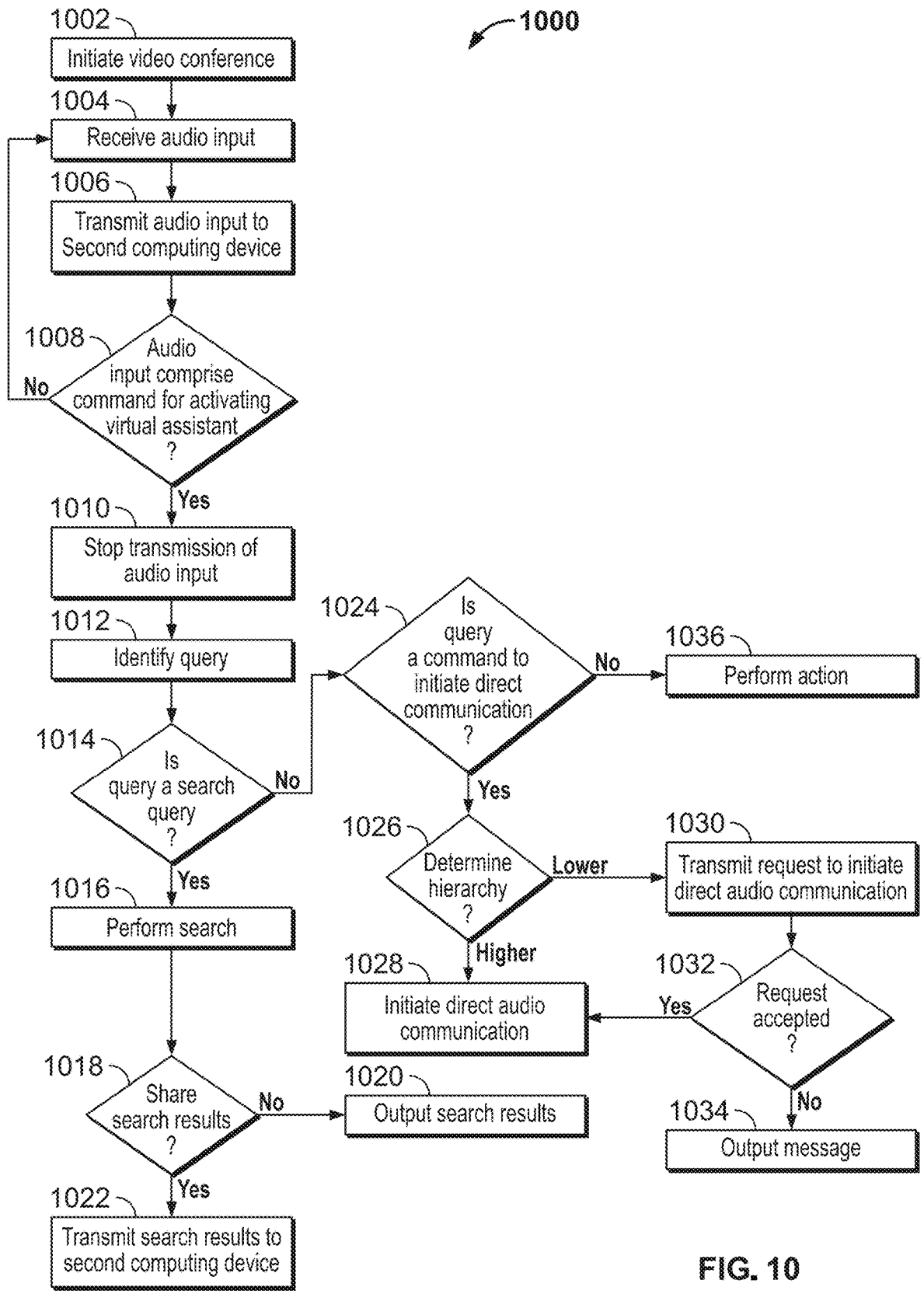
FIG. 10 shows a flowchart of illustrative steps involved in performing an action, via a virtual assistant, during a video conference, in accordance with some embodiments of the disclosure.

FIG. 10 shows a flowchart of illustrative steps involved in performing an action, via a virtual assistant, during a video conference, in accordance with some embodiments of the disclosure. Although the flowchart 1000 is directed towards a video conference, other embodiments (not shown) may include similar steps that are directed towards an audio conference. Process 1000 may be implemented on any of the aforementioned computing devices (e.g., computing device 102, 202, 302, 402, 502, 602, 702, 802, 900). In addition, one or more actions of the process 1000 may be incorporated into or combined with one or more actions of any other process or embodiments described herein.

At 1002, a video conference is initiated, and at 1004 audio input is received. The audio input is transmitted to a second computing device at 1006, and at 1008 it is determined whether the audio input comprises a command for activating a virtual assistant. If no command is identified, the process loops back to step 1004. If a command is identified, transmission of the audio input is stopped at 1010, and a query is identified at 1012. At 1014, it is identified whether the query is a search query. If the query is a search query, a search is performed at 1016, and it is determined whether the search results should be shared at 1018. If the search results should not be shared, the search results are output at 1020. If the search results should be shared, the computing device with which the search results should be shared is identified, and the search results are transmitted to that computing device at 1022. Returning to step 1014, if the query is not a search query, it is determined at 1024 whether the query is a command to initiate direct audio communication with another computing device on the video conference. If the query is a command to initiate a direct audio communication with another computing device, a hierarchy is determined at 1026. If the transmitting computer is higher in the hierarchy, a direct audio communication is initiated at 1028. If the transmitting computing is equal to or lower in the hierarchy, a request to initiate a direct audio communication is transmitted at 1030. At 1032, it is determined if the request is accepted. If the request is accepted, the process proceeds to step 1028. If the request is not accepted, the process proceeds to step 1034, where a message indicating that that request has not been accepted is generated for output. Returning to step 1024, if the query is not a command to initiate a direct audio communication, an action is identified based on the query and the action is performed at 1036.

Figure 11:
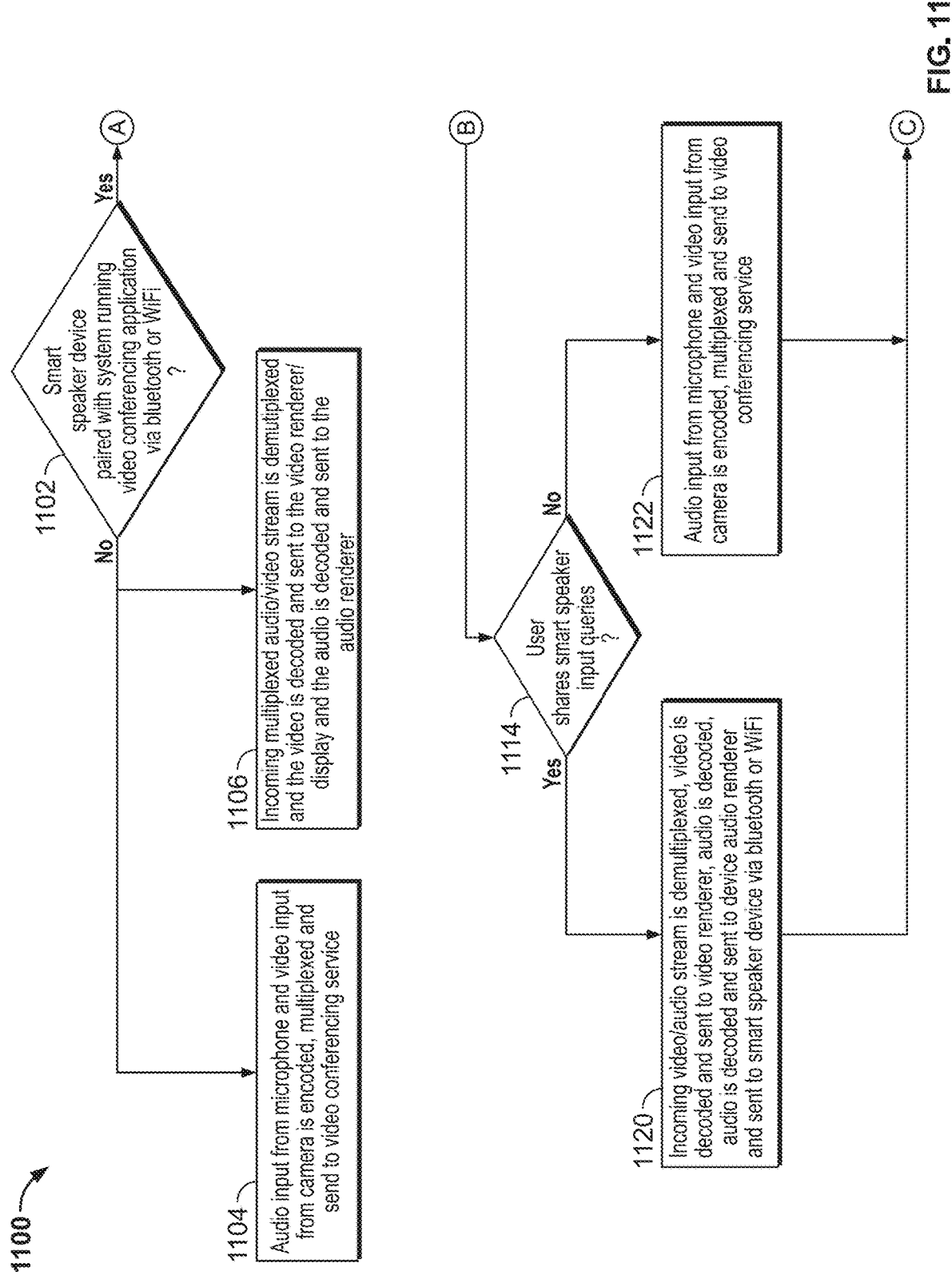
FIG. 11 shows another flowchart of illustrative steps involved in performing an action, via a virtual assistant, during a video conference, in accordance with some embodiments of the disclosure.
Figure 11:
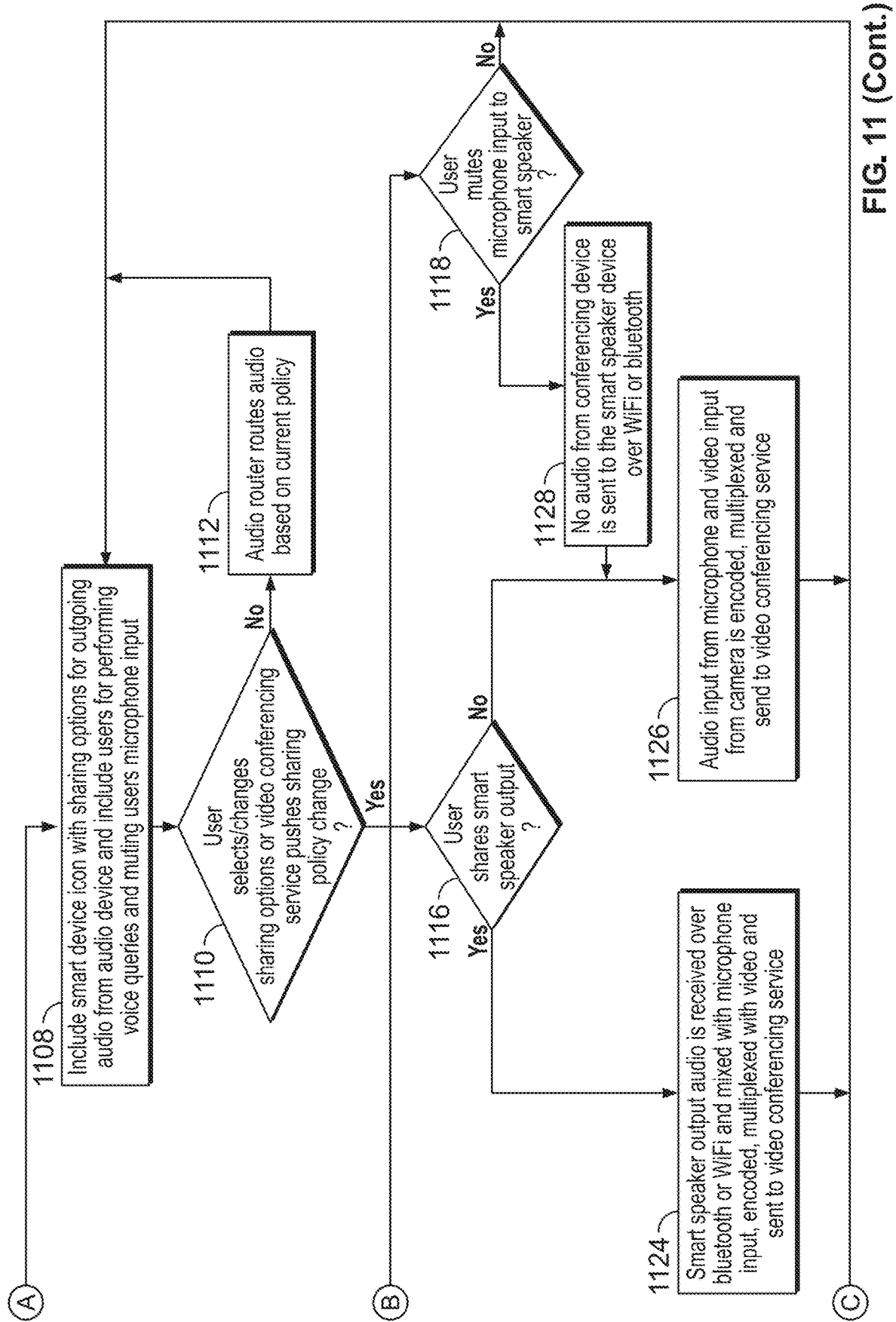

FIG. 11 shows another flowchart of illustrative steps involved in performing an action, via a virtual assistant, during a video conference, in accordance with some embodiments of the disclosure. Process 1100 may be implemented on any of the aforementioned computing devices (e.g., computing device 102, 202, 302, 402, 502, 602, 702, 802, 900). In addition, one or more actions of the process 1100 may be incorporated into or combined with one or more actions of any other process or embodiments described herein.

At 1102, it is determined whether a smart speaker is paired with a computing device running the video conferencing application. If a smart speaker is not paired with the computing device, then audio and video input received from the computing device microphone and camera is encoded, multiplexed and transmitted to the video conferencing service at 1104. In a similar manner, audio and video received from other video conference participants are demultiplexed, decoded and output at a speaker and display of the computing device. If, at 1102, it is determined that a smart speaker is paired with the computing device, at 1108, an icon is displayed at the computing device that enables sharing options for outgoing audio, queries to be performed via the smart speaker and the microphone input of the computing device to be muted. At 1110, it is determined whether any input is received via the icon (e.g., via a touch event associated with the icon). If no input is received, the audio is routed based on the current policy at 1112 and the process loops to step 1108. If, at 1110, it is determined that input is received at the icon, a relevant option is determined. Options include: whether the smart speaker is shared with other video conference participants, to enable queries to be transmitted to the smart speaker from other video conference participants; whether the smart speaker output, for example, the results of a query, is to be shared with other video conference participants; and whether the smart speaker microphone has been muted. At 1114, it is determined whether the smart speaker is shared with other video conference participants. If the smart speaker is shared, at 1120, audio and video received from other video conference participants are demultiplexed, decoded and the audio is transmitted to the smart speaker. If, at 1114, it is determined that the smart speaker has not been shared, then the audio input is encoded, multiplexed and transmitted to the other video conference participants at 1122. Following steps 1120 or 1122, the process loops around to step 1108. At 1116, it is determined whether the smart speaker output is to be shared with other video conference participants. If it is determined that that the smart speaker output is to be shared with the other video conference participants, the output of the smart speaker is encoded, multiplexed, and shared with the other video conference participants at 1124. If, at 1116, it is determined that the smart speaker output is not to be shared, then the audio input (i.e., just from the participant, and not the smart speaker output) is encoded, multiplexed and transmitted to the other video conference participants at 1126. Following steps 1124 or 1126, the process loops around to step 1108. At 1118, it is determined whether the user has muted audio input to the smart speaker. If the user has muted input to the smart speaker, at 1128, no audio is sent from the computing device to the smart speaker and the process proceeds to step 1126. If the smart speaker audio input is not muted, the process loops around to step 1108.

Figure 12:
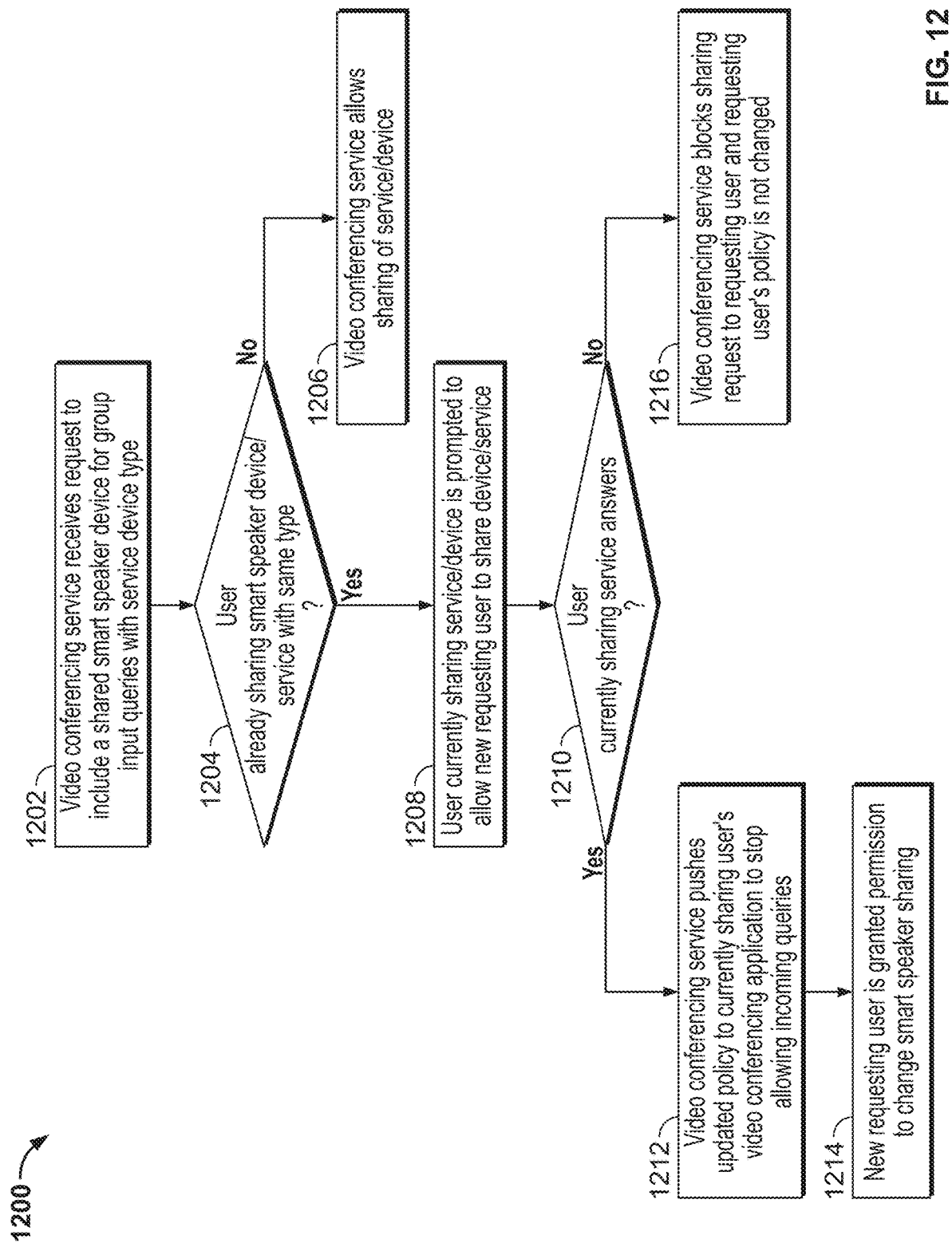
FIG. 12 shows another flowchart of illustrative steps involved in performing an action, via a virtual assistant, during a video conference, in accordance with some embodiments of the disclosure.

FIG. 12 shows another flowchart of illustrative steps involved in performing an action, via a virtual assistant, during a video conference, in accordance with some embodiments of the disclosure. Process 1200 may be implemented on any of the aforementioned computing devices (e.g., computing device 102, 202, 302, 402, 502, 602, 702, 802, 900). In addition, one or more actions of the process 1200 may be incorporated into or combined with one or more actions of any other process or embodiments described herein.

FIG. 12 depicts how a request to add a smart speaker, for example, a physical and/or application-implemented smart speaker, to an existing video conference that is implemented via a video conferencing service. At 1202, a request to share a smart speaker with video conferencing participants is received. At 1204, it is determined whether a participant is already sharing a smart speaker of the same type. If the user is not already sharing a smart speaker of the same type, at 1206, the video conferencing service enables the smart speaker to be shared. If a smart speaker of the same type is already being shared, then the participant that is already sharing the smart speaker is sent a request to allow the new smart speaker to be shared at 1208. At 1210, a response to the request is received. If the user enables the new smart speaker to be shared, at 1212, the video conferencing service transmits an updated policy to all video conference participants to stop the current smart speaker from receiving new queries. At 1214, the new smart speaker is shared with the video conference participants. If, at 1210, the user declines to enable the new smart speaker to be shared, at 1216, the video conferencing service blocks the sharing request, and the policy is not updated.

Figure 13:
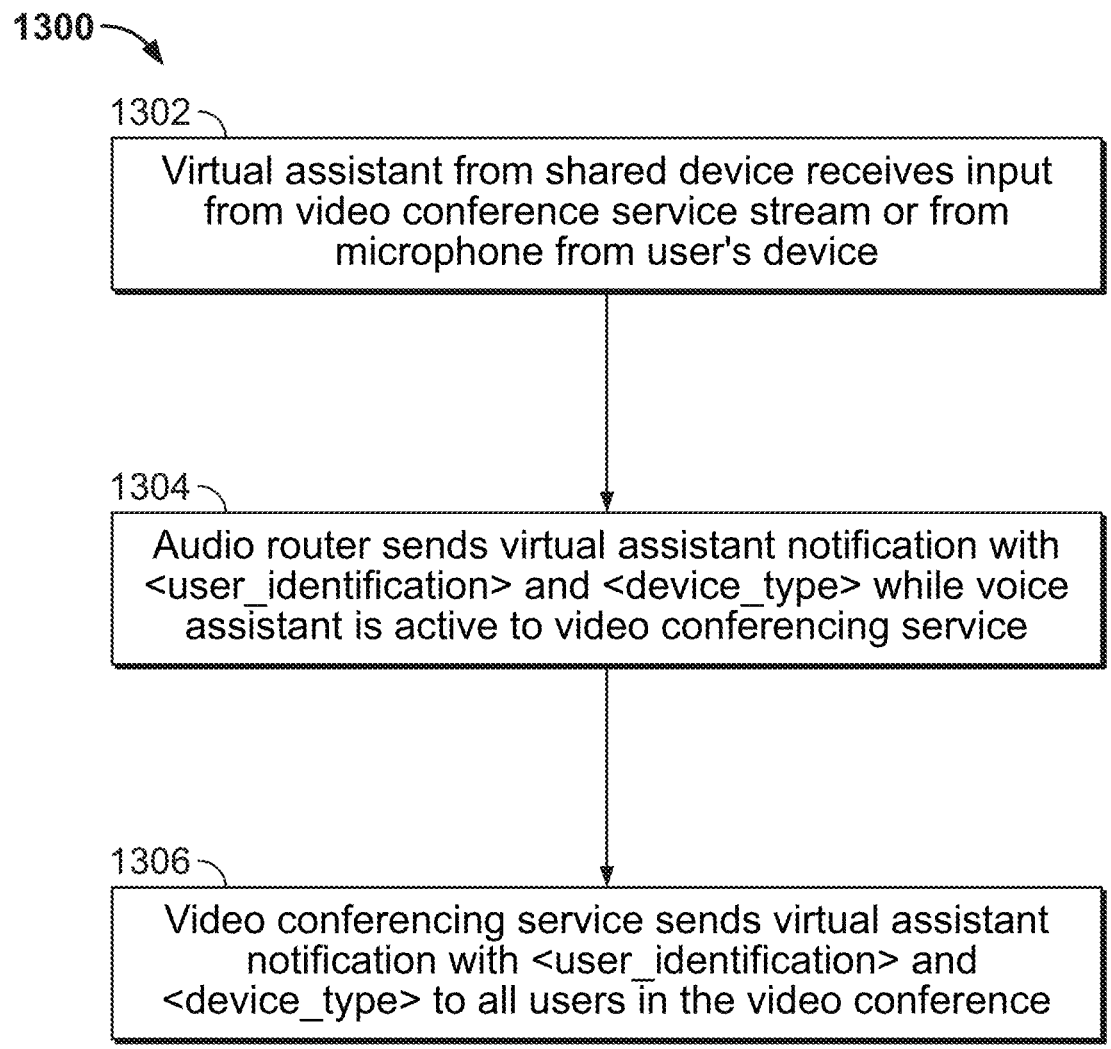
FIG. 13 shows another flowchart of illustrative steps involved in performing an action, via a virtual assistant, during a video conference, in accordance with some embodiments of the disclosure.

FIG. 13 shows another flowchart of illustrative steps involved in performing an action, via a virtual assistant, during a video conference, in accordance with some embodiments of the disclosure. Process 1300 may be implemented on any of the aforementioned computing devices (e.g., computing device 102, 202, 302, 402, 502, 602, 702, 802, 900). In addition, one or more actions of the process 1300 may be incorporated into or combined with one or more actions of any other process or embodiments described herein.

The process depicted in FIG. 13 and FIG. 14 below enables a user and user device type to be identified when a smart speaker responds to a video conference that is implemented via a video conferencing service. At 1302, a virtual assistant receives input from the video conference and/or the microphone from a computing device. At 1304, an audio routing service sends the virtual assistant a notification defining a user identifier and a device type, and, at 1306, the video conferencing service transmits a virtual assistant notification sharing the user identifier and the device type to all users in the video conference.

Figure 14:
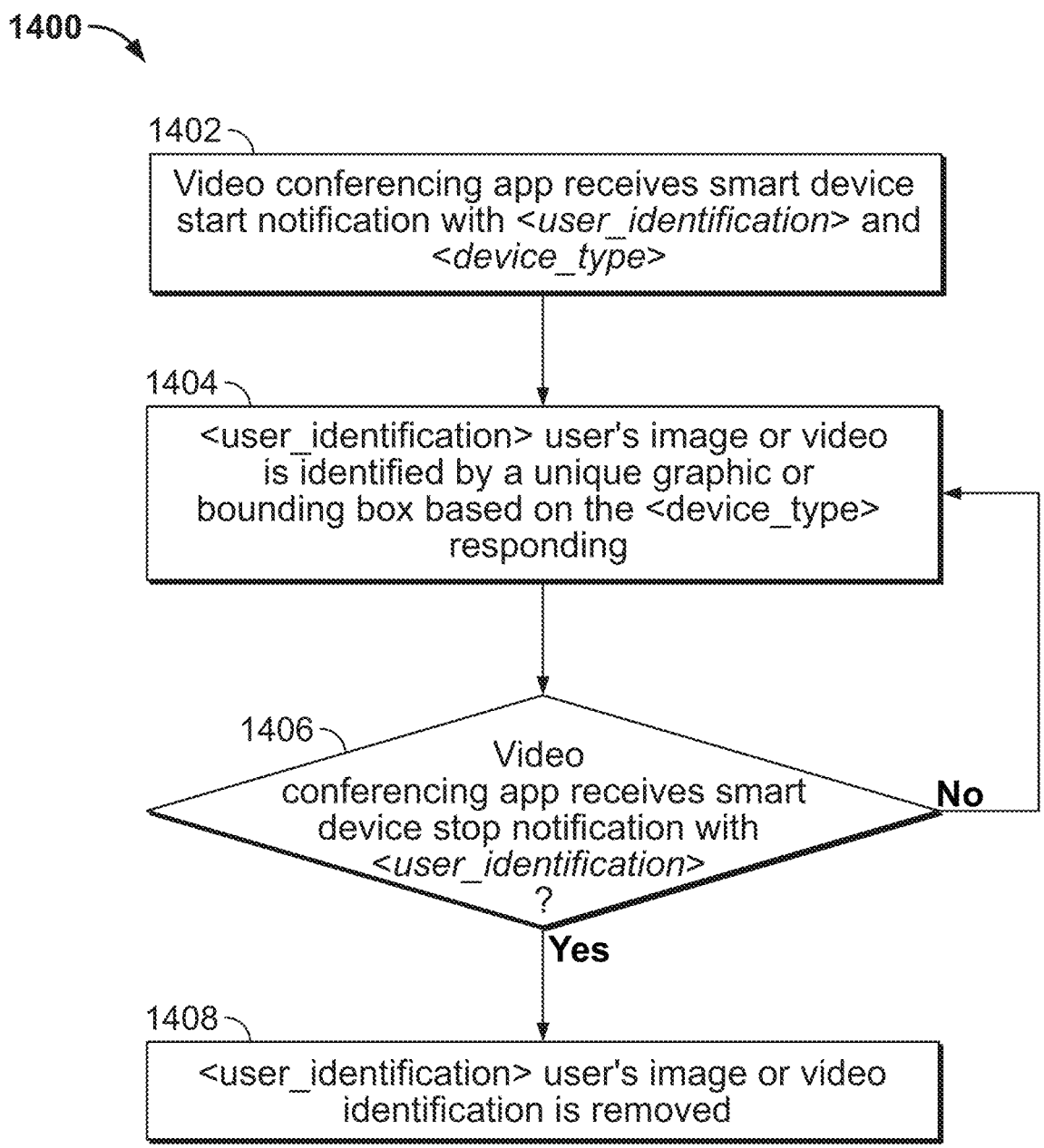
FIG. 14 shows another flowchart of illustrative steps involved in performing an action, via a virtual assistant, during a video conference, in accordance with some embodiments of the disclosure.

FIG. 14 shows another flowchart of illustrative steps involved in performing an action, via a virtual assistant, during a video conference, in accordance with some embodiments of the disclosure. Process 1400 may be implemented on any of the aforementioned computing devices (e.g., computing device 102, 202, 302, 402, 502, 602, 702, 802, 900). In addition, one or more actions of the process 1400 may be incorporated into or combined with one or more actions of any other process or embodiments described herein.

At 1402, a video conferencing application receives a notification from a virtual assistant comprising a user identifier and a device type. At 1404, an image, or video, associated with the user is identified by a unique graphic, depending on the device type. At 1406, it is determined whether the video conferencing application receives a notification to stop displaying the image and/or video associated with the user. If no notification is received, the process loops back to step 1404. If a notification is received, the image, or video, is removed at 1408.

The processes described above are intended to be illustrative and not limiting. One skilled in the art would appreciate that the steps of the processes discussed herein may be omitted, modified, combined, and/or rearranged, and any additional steps may be performed without departing from the scope of the disclosure. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   initiating, between a first computing device and at least a second computing device, a conference, wherein the first computing device is connected to the conference via a cellular network and the second computing device is connected to the conference via a non-cellular network;
   receiving, at an audio input device, audio input, wherein the audio input is received during the conference and the audio input device is in communication with the first computing device;
   transmitting, to the second computing device, the audio input;
   identifying, in the audio input, a command for activating a virtual assistant;
   in response to identifying the command:
      activating the virtual assistant; and
      automatically stopping the transmission of the audio input to at least the second computing device;
   receiving, at the audio input device, a query comprising a search query;
   receiving, from the first computing device, an indication of a low quality network connection;
   based on receiving the indication of the low quality network connection, transmitting, from the first computing device to the second computing device, the search query;
   receiving results of the search query at the second computing device; and
   transmitting at least a portion of the results of the search query to the first computing device.

2. The method of claim 1, wherein:
   the audio input device is a first audio input device;
   receiving the audio input further comprises receiving the audio input at a second audio input device, wherein the second audio input device is in communication with the first computing device;
   transmitting the audio input further comprises transmitting the audio input from the first audio input device;
   automatically stopping transmission of the audio input further comprises muting the first audio input device; and
   receiving the query further comprises receiving the query via the second audio input device.

3. The method of claim 2, wherein the second audio input device is a smart speaker.

4. The method of claim 1, wherein:
   the audio input device is a first audio input device, and the first computing device is in communication with a second audio input device, the method further comprising:
   receiving, at a third audio input device, a second audio input, wherein the second audio input is received during the conference and the third audio input device is in communication with the second computing device; and, in response to an input:
      enabling the second computing device to transmit the second audio input to the second audio input device;
      identifying, in the second audio input, a second command for activating the virtual assistant;
      activating the virtual assistant in response to identifying the second command;
      receiving, at the third audio input device, a second query; and
      performing, based on the second query, a second an action via the virtual assistant.

5. The method of claim 1, wherein:
   initiating the conference further comprises initiating the conference between the first computing device and a third computing device, wherein the conference comprises audio and video components that are transmitted between all of the computing devices of the conference;
   transmitting the audio input further comprises transmitting the audio input to the third computing device;
   the query comprises a request to initiate direct audio communication between the first computing device and the second computing device; and, in response to the query:
      the transmission of the audio component of the conference between the first and second computing devices and the third computing device is stopped; and
      a direct audio transmission between the first computing device and the second computing device is initiated.

6. The method of claim 5, further comprising, in response to the query to initiate direct audio communication between the first computing device and the second computing device:
   transmitting the request from the first computing device to the second computing device to initiate the direct audio transmission; and wherein:
      initiating the direct audio transmission between the first computing device and the second computing device further comprises initiating the direct audio transmission in response to the request being accepted.

7. The method of claim 5, further comprising:
   identifying a hierarchy of conference participants; and, in response to the query to initiate direct audio communication between the first computing device and the second computing device:
      identifying whether the requesting participant is higher in the hierarchy; and:
         if the requesting participant is higher in the hierarchy:
            initiating the direct audio transmission further comprises automatically initiating the direct audio transmission; or
         if the requesting participant is at the same level, or lower in the hierarchy:
            transmitting the request from the first computing device to the second computing device to initiate the direct audio transmission; and
            initiating the direct audio transmission between the first computing device and the second computing device further comprises initiating the direct audio transmission in response to the request being accepted.

8. The method of claim 5, further comprising:
generating for display, at least one of the computing devices, a representation of the participants in the conference; and, in response to initiating the direct audio transmission between the first computing device and the second computing device:
updating the representation of the participants in the conference to visually indicate the direct audio transmission between the first computing device and the second computing device.

9. The method of claim 1, wherein the conference is a video conference or an audio conference.

10. A system comprising:
a communication port;
a memory storing instructions; and
control circuitry communicably coupled to the memory and the communication port and configured to execute instructions to:
initiate via the communication port, between a first computing device and at least a second computing device, a conference, wherein the first computing device is connected to the conference via a cellular network and the second computing device is connected to the conference via a non-cellular network;
receive, at an audio input device, audio input, wherein the audio input is received during the conference and the audio input device is in communication with the first computing device;
transmit, to the second computing device, the audio input;
identify, in the audio input, a command for activating a virtual assistant;
in response to identifying the command:
activate the virtual assistant; and
automatically stop the transmission of the audio input to at least the second computing device;
receive, at the audio input device, a query comprising a search query;
receive, from the first computing device, an indication of a low quality network connection;
based on receiving the indication of the low quality network connection, transmit, from the first computing device to the second computing device, the search query;
receive results of the search query at the second computing device; and
transmit at least a portion of the results of the search query to the first computing device.

11. The system of claim 10, wherein:
the audio input device is a first audio input device;
the control circuitry configured to receive the audio input is further configured to receive the audio input at a second audio input device, wherein the second audio input device is in communication with the first computing device;
the control circuitry configured to transmit the audio input is further configured to transmit the audio input from the first audio input device;
the control circuitry configured to automatically stop transmission of the audio input further is further configured to mute the first audio input device; and
the control circuitry configured to receive the query is further configured to receive the query via the second audio input device.

12. The system of claim 10, wherein:
the audio input device is a first audio input device, and the first computing device is in communication with a second audio input device, the system further comprising control circuitry configured to:
receive, at a third audio input device, a second audio input, wherein the second audio input is received during the conference and the third audio input device is in communication with the second computing device; and, in response to an input:
enable the second computing device to transmit the second audio input to the second audio input device;
identify, in the second audio input, a second command for activating the virtual assistant;
activate the virtual assistant in response to identifying the second command;
receive, at the third audio input device, a second query; and
perform, based on the second query, an action via the virtual assistant.

13. The system of claim 10, wherein:
the control circuitry configured to initiate the conference is further configured to initiate the conference between the first computing device and a third computing device, wherein the conference comprises audio and video components that are transmitted between all of the computing devices of the conference;
the control circuitry configured to transmit the audio input is further configured to transmit the audio input to the third computing device;
the query comprises a request to initiate direct audio communication between the first computing device and the second computing device; and, in response to the query, the control circuitry is further configured to:
stop the transmission of the audio component of the conference between the first and second computing devices and the third computing device; and
initiate a direct audio transmission between the first computing device and the second computing device.

14. The system of claim 13, wherein, in response to the query to initiate direct audio communication between the first computing device and the second computing device, the control circuitry is further configured to:
transmit the request from the first computing device to the second computing device to initiate the direct audio transmission; and wherein:
the control circuitry configured to initiate the direct audio transmission between the first computing device and the second computing device is further configured to initiate the direct audio transmission in response to the request being accepted.

15. The system of claim 13, wherein the control circuitry is further configured to:
identify a hierarchy of conference participants; and, in response to the query to initiate direct audio communication between the first computing device and the second computing device:
identify whether the requesting participant is higher in the hierarchy; and:
if the requesting participant is higher in the hierarchy:
the control circuitry configured to initiate the direct audio transmission is further configured to automatically initiate the direct audio transmission; or
if the requesting participant is at the same level, or lower in the hierarchy:

transmit the request from the first computing device to the second computing device to initiate the direct audio transmission; and wherein the control circuitry configured to initiate the direct audio transmission between the first computing device and the second computing device is further configured to initiate the direct audio transmission in response to the request being accepted.

16. The system of claim 13, wherein the control circuitry is further configured to:

generate for display, at least one of the computing devices, a representation of the participants in the conference; and, in response to initiating the direct audio transmission between the first computing device and the second computing device:

update the representation of the participants in the conference to visually indicate the direct audio transmission between the first computing device and the second computing device.

* * * * *

UNITED STATES PATENT AND TRADEMARK OFFICE
CERTIFICATE OF CORRECTION

| | | |
|---|---|---|
| PATENT NO. | : 12,348,900 B2 | Page 1 of 1 |
| APPLICATION NO. | : 17/965586 | |
| DATED | : July 1, 2025 | |
| INVENTOR(S) | : Reda Harb, Christopher Phillips and Tao Chen | |

It is certified that error appears in the above-identified patent and that said Letters Patent is hereby corrected as shown below:

In the Claims

Claim 4, Column 20, Line 19, delete "a second" after the ",".

Signed and Sealed this
Twenty-sixth Day of August, 2025

Coke Morgan Stewart
*Acting Director of the United States Patent and Trademark Office*